(12) United States Patent
Hongo et al.

(10) Patent No.: US 12,162,290 B2
(45) Date of Patent: Dec. 10, 2024

(54) IMAGE RECORDING METHOD

(71) Applicant: FUJIFILM Corporation, Tokyo (JP)

(72) Inventors: Yushi Hongo, Kanagawa (JP); Ryuji Shinohara, Kanagawa (JP); Masaharu Kawai, Kanagawa (JP); Masao Ikoshi, Kanagawa (JP); Taiga Mizoe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 18/049,717

(22) Filed: Oct. 26, 2022

(65) Prior Publication Data
US 2023/0092800 A1 Mar. 23, 2023

Related U.S. Application Data

(63) Continuation of application No. PCT/JP2021/016841, filed on Apr. 27, 2021.

(30) Foreign Application Priority Data

Apr. 27, 2020 (JP) ................ 2020-078680

(51) Int. Cl.
B41J 2/21 (2006.01)
B41J 2/14 (2006.01)
(Continued)

(52) U.S. Cl.
CPC ........... *B41J 2/2117* (2013.01); *B41J 2/1433* (2013.01); *C09D 11/033* (2013.01);
(Continued)

(58) Field of Classification Search
CPC ..... B41J 2/2117; B41J 2/1433; C09D 11/033; C09D 11/037; C09D 11/107; C09D 11/322
See application file for complete search history.

(56) References Cited

U.S. PATENT DOCUMENTS 10,640,666 B2 * 5/2020 Makuta ................. C09D 11/36
2010/0056704 A1 * 3/2010 Iwamura ............... C09D 11/40
347/100

(Continued)

FOREIGN PATENT DOCUMENTS

CN 108698421 A 10/2018
CN 109328142 A 2/2019
(Continued)

OTHER PUBLICATIONS

Extended European Search Report issued Aug. 24, 2023 in Application No. 21795401.5.
(Continued)

*Primary Examiner* — Sharon Polk
(74) *Attorney, Agent, or Firm* — Sughrue Mion, PLLC

(57) ABSTRACT

Provided is an image recording method including a step of preparing an ink containing water and a white pigment, and a step of jetting the ink from an ink jet head in a liquid droplet amount of 1.0 pL or greater to apply the ink onto a base material, in which in a case where an ink jetting surface of the ink jet head is immersed in the ink in a vertically standing state for 2 seconds, the jetting surface is pulled up from the ink in the state, and the jetting surface is allowed to stand in the state for 1 minute, a ratio of an area of a region to which the ink is adhered to an area of the jetting surface is 40% by area or less.

14 Claims, 1 Drawing Sheet

(51) Int. Cl.
*C09D 11/033* (2014.01)
*C09D 11/037* (2014.01)
*C09D 11/107* (2014.01)
*C09D 11/322* (2014.01)

(52) U.S. Cl.
CPC .......... *C09D 11/037* (2013.01); *C09D 11/107* (2013.01); *C09D 11/322* (2013.01)

(56) References Cited

U.S. PATENT DOCUMENTS

| | | | |
|---|---|---|---|
| 2016/0289486 A1* | 10/2016 | Nishimura | ............. C09D 11/38 |
| 2017/0247561 A1 | 8/2017 | Nakagawa et al. | |
| 2019/0039384 A1 | 2/2019 | Matsumoto et al. | |
| 2019/0134989 A1 | 5/2019 | Matsumoto et al. | |
| 2019/0185691 A1 | 6/2019 | Takeshita et al. | |
| 2021/0071021 A1 | 3/2021 | Matsumoto et al. | |
| 2021/0108100 A1 | 4/2021 | Nishimura | |
| 2021/0130639 A1 | 5/2021 | Sugihara et al. | |
| 2021/0395552 A1 | 12/2021 | Hongo et al. | |

FOREIGN PATENT DOCUMENTS

| | | | | |
|---|---|---|---|---|
| CN | 109715743 A | 5/2019 | | |
| JP | 2005-199480 A | 7/2005 | | |
| JP | 2011-194744 A | 10/2011 | | |
| JP | 2014-189753 A | 10/2014 | | |
| JP | 2015-124348 A | 7/2015 | | |
| JP | 2015-183149 A | 10/2015 | | |
| JP | 2016-44200 A | 4/2016 | | |
| JP | 2017-132915 A | 8/2017 | | |
| JP | 2017-222744 A | 12/2017 | | |
| JP | 2018-2929 A | 1/2018 | | |
| JP | 2018-094902 A | 6/2018 | | |
| JP | 2019-10831 A | 1/2019 | | |
| JP | 2019-094377 A | 6/2019 | | |
| JP | 2019-111763 A | 7/2019 | | |
| JP | 2019-183063 A | 10/2019 | | |
| WO | WO-2016175738 A1 * | 11/2016 | ............. C09D 11/00 | |
| WO | 2017/138439 A1 | 8/2017 | | |
| WO | 2019/130704 A1 | 7/2019 | | |
| WO | 2019/131215 A1 | 7/2019 | | |
| WO | 2019/187665 A1 | 10/2019 | | |
| WO | 2020/054289 A1 | 3/2020 | | |
| WO | 2020/195505 A1 | 10/2020 | | |

OTHER PUBLICATIONS

Office Action issued Mar. 29, 2024 in Chinese Application No. 202180031014.8.
International Preliminary Report on Patentability dated Oct. 27, 2022 in International Application No. PCT/JP2021/016841.
Written Opinion of the International Searching Authority dated Jun. 29, 2021 in International Application No. PCT/JP2021/016841.
International Search Report dated Jun. 29, 2021 in International Application No. PCT/JP2021/016841.
Office Action issued Oct. 3, 2023 in Japanese Application No. 2022-518093.
Office Action issued May 9, 2023 in Japanese Application No. 2022-518093.

* cited by examiner

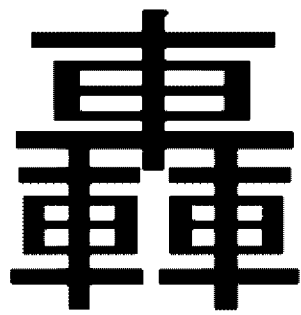

IMAGE RECORDING METHOD

CROSS-REFERENCE TO RELATED APPLICATIONS

This application is a continuation application of International Application No. PCT/JP2021/016841, filed Apr. 27, 2021, which is incorporated herein by reference. Further, this application claims priority from Japanese Patent Application No. 2020-078680, filed Apr. 27, 2020, which is incorporated herein by reference.

BACKGROUND OF THE INVENTION

1. Field of the Invention

The present disclosure relates to an image recording method.

2. Description of the Related Art

In the related art, various examinations have been conducted on image recording methods.

For example, JP2018-2929A discloses a particle capable of forming a particle structure from which a structural color can be observed, the particle including a core portion, and a shell portion having a film thickness of 1.0 nm or greater and 10.0 nm or less, which is formed of polydopamine or a derivative thereof, in which the extinction coefficient of the particle with respect to light at a wavelength of 380 nm or greater and 780 nm or less is 0.1 or less, and the refractive index of the particle with respect to light at a wavelength 380 nm or greater and 780 nm or less is 1.7 or greater.

JP2018-2929A also discloses an ink containing the particle and a method of recording an image using the ink by an ink jet method.

Further, JP2015-124348A describes, as an aqueous ink jet ink which has excellent printing suitability and jetting stability on a base material with low absorbency and contains, as a pigment, titanium oxide with excellent ink physical properties such as storage stability, settleability, and a covering property, an aqueous ink jet ink containing at least water, titanium oxide, a dispersing agent, and an organic solvent, in which the pigment surface of the titanium oxide is treated with an organic compound, the amount of a base on the pigment surface of the titanium oxide is 28 μmol/g or greater, the dispersing agent is an acidic dispersant having an acid value of 5 mgKOH/g or greater and 150 mgKOH/g or less, and the aqueous ink jet ink contains at least one or more organic solvents having a boiling point of 200° C. or higher and 265° C. or lower and a surface tension of 20 mN/m or greater and 30 mN/m or lower as the organic solvent.

SUMMARY OF THE INVENTION

However, the image recording method using an ink is required to further improve the continuous jettability of the ink and the covering property of an image in some cases.

An object of one aspect of the present disclosure is to provide an image recording method in which continuous jettability of an ink and the covering property of an image are excellent.

Specific means for achieving the above-described objects includes the following aspects.

<1> An image recording method comprising: a step of preparing an ink containing water and a white pigment; and a step of jetting the ink from an ink jet head in a liquid droplet amount of 1.0 pL or greater to apply the ink onto a base material, in which in a case where an ink jetting surface of the ink jet head is immersed in the ink in a vertically standing state for 2 seconds, the jetting surface is pulled up from the ink in the state, and the jetting surface is allowed to stand in the state for 1 minute, a ratio of an area of a region to which the ink is adhered to an area of the jetting surface is 40% by area or less.

<2> The image recording method according to <1>, in which the ratio of the area of the region to which the ink is adhered to the area of the jetting surface is 15% by area or less.

<3> The image recording method according to <1> or <2>, in which the ink further contains a solvent S1 which is a water-soluble organic solvent having a contact angle of 85° or less with respect to the jetting surface, and a content of the solvent S1 is in a range of 0.1% by mass to 10% by mass with respect to a total amount of the ink.

<4> The image recording method according to <3>, in which the solvent S1 includes a water-soluble organic solvent having a contact angle of 800 or less with respect to the jetting surface.

<5> The image recording method according to <4>, in which the solvent S1 includes a water-soluble organic solvent having a contact angle of 750 or less with respect to the jetting surface.

<6> The image recording method according to any one of <3> to <5>, in which the solvent S1 includes alkylene glycol monoalkyl ether.

<7> The image recording method according to any one of <3> to <6>, in which the solvent S1 includes at least one selected from the group X consisting of ethylene glycol monopropyl ether, ethylene glycol monobutyl ether, propylene glycol monomethyl ether, propylene glycol monoethyl ether, propylene glycol monopropyl ether, propylene glycol monobutyl ether, and dipropylene glycol monomethyl ether.

<8> The image recording method according to <7>, in which the solvent S1 includes at least two selected from the group X.

<9> The image recording method according to any one of <1> to <8>, in which a content of a water-soluble organic solvent having a boiling point of 220° C. or higher in the ink is 5% by mass or less.

<10> The image recording method according to any one of <1> to <9>, in which the ink further contains a polymer dispersant, and the polymer dispersant contains a blocking polymer or a polymer having a crosslinked structure.

<11> The image recording method according to any one of <1> to <10>, in which a standard deviation of a volume-based particle size distribution of dispersed particles containing the white pigment in the ink is 140 nm or less.

<12> The image recording method according to any one of <1> to <11>, in which the base material is an impermeable base material.

<13> The image recording method according to any one of <1> to <12>, in which the step of applying the ink is a step of applying the ink onto the base material using a single pass method.

<14> The image recording method according to any one of <1> to <13>, in which a diameter of a jetting hole for jetting the ink in the ink jet head is 20 μm or less.

According to the aspect of the present disclosure, it is possible to provide an image recording method in which continuous jettability of an ink and the covering property of an image are excellent.

BRIEF DESCRIPTION OF THE DRAWINGS

FIG. 1 is a black character image used for evaluating the covering property of images in examples.

DESCRIPTION OF THE PREFERRED EMBODIMENTS

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, "image" denotes an entire film formed by applying an ink, and "image recording" denotes formation of the film.

Further, the concept of "image" in the present disclosure also includes a solid image.

[Image Recording Method]

An image recording method of the present disclosure includes a step of preparing an ink containing water and a white pigment (hereinafter, also referred to as "ink preparing step"), and a step of jetting the ink from an ink jet head in a liquid droplet amount of 1.0 pL (picoliter) or greater to apply the ink onto a base material (hereinafter, also referred to as "ink applying step"), in which in a case where an ink jetting surface of the ink jet head is immersed in the ink in a vertically standing state for 2 seconds, the jetting surface is pulled up from the ink in the state, and the jetting surface is allowed to stand in the state for 1 minute (hereinafter, the operation up to this point is also referred to as "dripping property test"), the ratio of an area of a region to which the ink is adhered to an area of the jetting surface (hereinafter, also referred to as "ink adhesion rate after the dripping property test") is 40% by area or less.

The image recording method of the present disclosure has excellent continuous jettability of an ink and an excellent covering property of an image.

The reason why such an effect is exhibited is assumed as follows.

In the image recording method of the present disclosure, the covering property of an image is improved by satisfying both conditions that the ink contains a white pigment and the liquid droplet amount of the ink is 1.0 pL or greater.

Here, the covering property of an image is a property of an image that a base (such as an impermeable base material or a chromatic image recorded on an impermeable base material) where the image is recorded is covered by the image.

However, it was found that the continuous jettability of the ink is degraded in a case where the liquid droplet amount of the ink is 1.0 pL or greater. The reason for this is considered to be that the ink is likely to overflow from a jetting hole (that is, a nozzle) in the ink jet head as the liquid droplet amount of the ink increases (that is, the volume of the liquid droplets) and the overflowed ink is likely to adhere to a jetting surface (that is, a nozzle surface) in the ink jet head. That is, it is considered that the jetting failure (for example, jet bending) of the ink is likely to occur due to the ink adhered to the jetting surface, and thus the continuous jettability of the ink is likely to be degraded.

In regard to the above-described problem in the case where the liquid droplet amount of the ink is 1.0 pL or greater, the ink adhesion rate after the dripping property test is 40% by area or less according to the image recording method of the present disclosure. In this manner, the dripping property of the ink from the jetting surface (that is, a property that the ink is easily removed from the jetting surface) is improved in a case where the ink is adhered to the jetting surface of the ink jet head. As a result, degradation of the continuous jettability of the ink is suppressed even though the liquid droplet amount of the ink is 1.0 pL or greater. The reason why the image recording method of the present disclosure has excellent continuous jettability of the ink and an excellent covering property of an image is assumed as described above.

<Ink Adhesion Rate after Dripping Property Test>

In the present disclosure, the dripping property test denotes an operation of immersing the ink jetting surface of the ink jet head in the ink for 2 seconds in a vertically standing state, pulling up the jetting surface from the ink in the state, and allowing the jetting surface to stand in the state for 1 minute.

Here, the state in which the jetting surface vertically stands denotes a state in which a normal direction of the jetting surface (that is, a direction perpendicular to the jetting surface) is the horizontal direction.

In the present disclosure, the ink adhesion rate (% by area) after the dripping property test is a value that correlates with the ink dripping property (ease of removal) from the jetting surface.

In a case where the ink dripping property is excellent, the ink drips from the jetting surface due to the gravity after the dripping property test, and as a result, the region to which the ink is adhered decreases and the ink adhesion rate after the dripping property test decreases.

In a case where the ink dripping property is poor, the region to which the ink remains adhered increases on the jetting surface after the dripping property test, and the ink adhesion rate after the dripping property test increases.

The ink adhesion rate (% by area) after the dripping property test is measured as follows.

The jetting surface in the ink jet head after the dripping property test (that is, after the ink is allowed to stand for 1 minute) is photographed, and the obtained photograph is subjected to a binarization treatment.

The binarization treatment is performed by using, for example, image analysis software "ImageJ" (manufactured by National Institutes of Health NIH).

The ratio (% by area) of the area of the region to which the ink is adhered to the area of the entire jetting surface immersed in the ink is acquired using the obtained binarized image, and the acquired value is set as the ink adhesion rate (% by area) after the dripping property test.

In the present disclosure, the ink adhesion rate after the dripping property test is 40% by area or less. In this manner, since the dripping property of the ink from the jetting surface is excellent to some extent, the occurrence of jetting failure due to the ink adhered to the jetting surface is suppressed, and as a result, the continuous jettability of the ink is improved.

From the viewpoint of further improving the continuous jettability of the ink, the ink adhesion rate after the dripping property test is preferably 15% by area or less.

The lower limit of the ink adhesion rate after the dripping property test is not particularly limited and may be 0% by area or greater than 0% by area (for example, 1% by area or 5% by area).

Hereinafter, each step that can be included in the image recording method of the present disclosure will be described.

<Ink Preparing Step>

The ink preparing step is a step of preparing an ink containing water and a white pigment.

The ink preparing step may be a step of producing the ink or a step of simply preparing the ink that has been produced in advance.

Hereinafter, the ink prepared in the present step will be described.

(White Pigment)

The ink contains at least one white pigment.

Known white pigments are used as the white pigment without particular limitation, and examples thereof include inorganic pigment particles such as titanium dioxide particles ($TiO_2$), zinc oxide particles, barium sulfate particles, silicon oxide particles, aluminum oxide particles, magnesium oxide particles, calcium silicate particles, calcium carbonate particles, kaolin particles, talc particles, and colloidal silica particles. Further, hollow resin particles are also exemplified as the white pigment.

From the viewpoint of the covering property of the image, it is particularly preferable that the white pigment contains titanium dioxide particles.

Since the titanium dioxide particles are particles having a large refractive index, the covering property of the image is further improved in a case where the white pigment contains the titanium dioxide particles.

Examples of the titanium dioxide particles include anatase type titanium dioxide particles, rutile type titanium dioxide particles, and brookite type titanium dioxide particles. Among these, from the viewpoint of the refractive index, rutile type titanium dioxide particles are preferable.

Further, the rutile type titanium dioxide particles also have an advantage that the influence on the resin in the ink, the resin base material, and the like is small because of a weaker photocatalytic action than that of the anatase type titanium dioxide particles or the brookite type titanium dioxide particles.

In a case where the white pigment contains titanium dioxide particles, the white pigment may contain a white pigment (for example, inorganic pigment particles) other than the titanium dioxide particles.

In a case where the white pigment contains titanium dioxide particles, the proportion of the titanium dioxide particles in the total amount of the white pigment is preferably 20% by mass or greater, more preferably 50% by mass or greater, and still more preferably 80% by mass or greater. The upper limit of the proportion of titanium dioxide particles in the total amount of the white pigment is not particularly limited and may be 100% by mass or less.

From the viewpoint of further improving the covering property of the image, the average primary particle diameter of the white pigment is preferably 100 nm or greater, more preferably 150 nm or greater, and still more preferably 200 nm or greater.

Further, from the viewpoint of dispersion stability of the ink (for example, the jetting stability in a case where the ink is used as the ink jet ink), the average primary particle diameter of the white pigment is preferably 400 nm or less and more preferably 300 nm or less.

In the present disclosure, the average primary particle diameter of the white pigment is a value measured using a transmission electron microscope (TEM). A transmission electron microscope 1200EX (manufactured by JEOL Ltd.) can be used for the measurement.

Specifically, the average particle diameter thereof is acquired by adding an ink diluted to 1,000 times dropwise to Cu200 mesh (manufactured by JEOL Ltd.) to which a carbon film has been attached, drying the ink, measuring the equivalent circle diameters of 300 independent particles of the white pigment which do not overlap each other in the image enlarged at a magnification of 100,000 times using a TEM, and averaging the measured values.

Further, from the viewpoint of the covering property of the image, the refractive index of the white pigment is preferably 2.0 or greater.

In the present disclosure, the "refractive index" indicates a value measured by ellipsometry using visible light having a wavelength of 550 nm at a temperature of 23° C., unless otherwise specified.

The content of the white pigment in the ink is preferably in a range of 1% by mass to 20% by mass, more preferably in a range of 3% by mass to 20% by mass, still more preferably in a range of 5% by mass to 20% by mass, even still more preferably in a range of 6% by mass to 20% by mass, and even still more preferably in a range of 7% by mass to 15% by mass with respect to the total amount of the ink.

In a case where the content of the white pigment in the ink is 1% by mass or greater with respect to the total amount of the ink, the covering property of the image is further improved.

In a case where the content of the white pigment in the ink is 20% by mass or less with respect to the total amount of the ink, the continuous jettability of the ink is further improved.

(Standard Deviation of Volume-Based Particle Size Distribution of Dispersed Particles Containing White Pigment)

In the present disclosure, the standard deviation of the volume-based particle size distribution of the dispersed particles containing a white pigment in the ink is preferably 160 nm or less, more preferably 150 nm or less, still more preferably 140 nm or less, and even still more preferably 130 nm or less.

In a case where the standard deviation is 160 nm or less, the proportion of coarse particles in the ink is reduced, and thus, the continuous jettability of the ink is further improved.

In the present disclosure, the standard deviation of the volume-based particle size distribution of dispersed particles containing a white pigment in the ink is measured by a dynamic scattering method using the ink diluted to 1,000 times. For example, a particle size distribution measuring device "NANOTRAC UPA-EX150" (manufactured by Nikkiso Co., Ltd.) is used as a measuring device.

In a case where the ink contains a polymer dispersant described below, the dispersed particles containing the white pigment are considered to be dispersed particles containing a white pigment and a polymer dispersant that interacts with the surface of the white pigment.

(Polymer Dispersant)

It is preferable that the ink contains at least one polymer dispersant.

The polymer dispersant has a function of dispersing the white pigment in the ink. Therefore, the dispersibility of the white pigment in the ink is further improved in a case where the ink contains a polymer dispersant.

In a case where the ink contains a polymer dispersant, the ink is considered to contain dispersed particles containing a white pigment and a polymer dispersant that interacts (for example, adsorbs) with the white pigment.

In the present disclosure, "polymer" denotes a compound having a weight-average molecular weight (Mw) of 1,000 or greater.

In the present disclosure, the weight-average molecular weight (Mw) denotes a value measured by gel permeation chromatography (GPC).

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 L, and a measurement temperature of 40° C. using an RI detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

As the polymer dispersant, known dispersants can be used without particular limitation.

For example, polymer dispersants described in known documents such as paragraphs 0080 to 0096 of JP2016-145312A and paragraphs 0078 to 0108 of WO2013/180074A can be used as the polymer dispersant.

An acrylic resin is preferable as the polymer dispersant.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

The weight-average molecular weight (Mw) of the polymer dispersant is preferably in a range of 3,000 to 100,000, more preferably in a range of 4,000 to 80,000, and still more preferably in a range of 5,000 to 60,000.

It is preferable that the polymer dispersant has a structural unit containing an adsorbing group and a structural unit containing an anionic group.

The structural unit containing an anionic group is a structural unit that contributes to dispersibility.

The polymer dispersant may have only one or two or more kinds of structural units containing an anionic group.

Examples of the anionic group include an acid group and a salt thereof.

Examples of the acid group include a carboxy group, a sulfo group, a phosphoric acid group, and a phosphonic acid group. Among these, a carboxy group is particularly preferable.

As the salt of the acid group, an alkali metal salt is preferable, and a sodium salt or a potassium salt is more preferable.

As the structural unit containing an anionic group, at least one of a structural unit derived from (meth)acrylic acid or a structural unit derived from a salt of (meth)acrylic acid is preferable.

In the present disclosure, the structural unit derived from a compound A (for example, (meth)acrylic acid) denotes a structural unit formed by polymerizing the compound A (for example, (meth)acrylic acid).

The adsorbing group in the structural unit containing an adsorbing group has a function of adsorbing to the white pigment.

The polymer dispersant may have only one or two or more kinds of structural units containing an adsorbing group.

The adsorbing group has preferably at least one selected from the group consisting of an aromatic ring structure, an alicyclic structure, and an alkyl group having 6 or more carbon atoms and more preferably at least one selected from the group consisting of an aromatic ring structure and an alicyclic structure.

It is preferable that the structural unit containing an adsorbing group is a structural unit derived from a (meth)acrylate containing an adsorbing group.

The polymer dispersant may be a random polymer (that is, a random copolymer), a block polymer (that is, a block copolymer), or a polymer having a crosslinked structure.

It is preferable that the polymer dispersant contains a block polymer or a polymer having a crosslinked structure. In this case, the polymer dispersant may contain both a block polymer and a polymer having a crosslinked structure.

In a case where the polymer dispersant contains a block polymer or a polymer having a crosslinked structure, the continuous jettability of the ink is further improved. The reason for this is considered to be that in a case where the polymer dispersant contains a block polymer or a polymer having a crosslinked structure, the interactivity between the polymer dispersant and the white pigment is further improved in the ink, occurrence of a released polymer dispersant is further suppressed, and thus an increase in viscosity of the ink due to the released polymer dispersant is suppressed.

From the viewpoint of further improving the continuous jettability of the ink, it is more preferable that the polymer dispersant contains a block polymer.

—Block Polymer—

It is preferable that the block polymer has a structural unit derived from a hydrophobic monomer and a structural unit derived from a monomer containing an anionic group (hereinafter, also referred to as "anionic group-containing monomer").

The structural unit derived from a hydrophobic monomer contained in the block polymer may be used alone or two or more kinds thereof.

The structural unit derived from an anionic group-containing monomer contained in the block polymer may be used alone or two or more kinds thereof.

Examples of the structural unit derived from a hydrophobic monomer include an ethylenically unsaturated compound having an aromatic ring structure or an alicyclic structure, and a (meta)acrylate containing an alkyl group having 1 to 20 carbon atoms.

The content of the structural unit derived from a hydrophobic monomer is preferably in a range of 35% by mass to 95% by mass, more preferably in a range of 50% by mass to 95% by mass, and still more preferably in a range of 70% by mass to 90% by mass with respect to the total amount of the block polymer.

From the viewpoint of the adsorptivity to the white pigment, it is preferable that the hydrophobic monomer contains an ethylenically unsaturated compound having an aromatic ring structure or an alicyclic structure.

It is preferable that the structural unit derived from the ethylenically unsaturated compound having an aromatic ring structure or an alicyclic structure is at least one selected from the group consisting of structural units represented by Formulae (A) to (F).

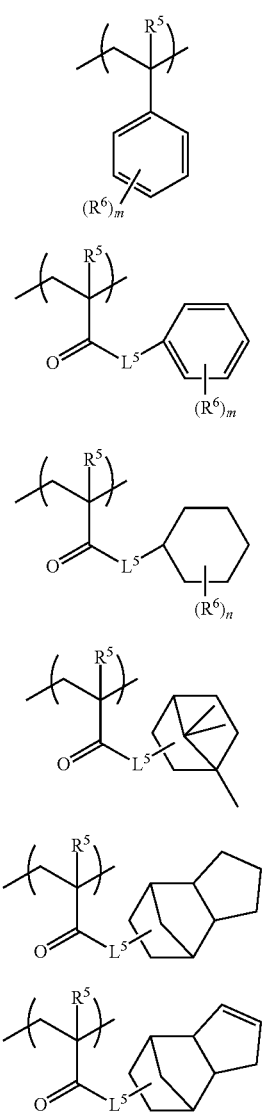

In Formulae (A) to (F), $R^5$'s each independently represent a hydrogen atom or a methyl group. $R^6$'s each independently represent an alkyl group, an alkenyl group, or an alkynyl group. m represents an integer of 0 to 5. n represents an integer of 0 to 11. $L^5$ represents a divalent group which is one selected from the first group consisting of an alkylene group having 1 to 18 carbon atoms, an arylene group having 6 to 18 carbon atoms, —O—, —NH—, —S—, and —C(=O)—, a divalent group obtained by combining two or more selected from the first group, or a single bond.

In Formulae (A) to (F), $R^6$'s each independently represent an alkyl group, an alkenyl group, or an alkynyl group.

As the alkyl group, an alkyl group having 1 to 10 carbon atoms is preferable, an alkyl group having 1 to 4 carbon atoms is more preferable, and a methyl group or an ethyl group is still more preferable.

As the alkenyl group, an alkenyl group having 2 to 10 carbon atoms is preferable, an alkenyl group having 2 to 4 carbon atoms is more preferable, and an alkenyl group having 2 or 3 carbon atoms is still more preferable.

As the alkynyl group, an alkynyl group having 2 to 10 carbon atoms is preferable, an alkynyl group having 2 to 4 carbon atoms is more preferable, and an alkynyl group having 2 or 3 carbon atoms is still more preferable.

Further, $R^6$ may represent an unsubstituted group or a group substituted with a substituent. In a case where $R^6$ is substituted with a substituent, examples of the substituent include a halogen atom (such as a chlorine atom or a bromine atom) and an alkyl group (such as a methyl group or an ethyl group).

In Formula (A) and Formula (B), m represents the number of substituents ($R^6$) for the benzene ring.

Further, m represents an integer of 0 to 5, preferably an integer of 0 to 3, more preferably an integer of 0 to 2, and still more preferably 0 or 1.

In Formula (C), n represents the number of substituents ($R^6$) for the cyclohexane ring.

Further, n represents an integer of 0 to 11, preferably an integer of 0 to 6, more preferably an integer of 0 to 2, and still more preferably 0 or 1.

In Formulae (A) to (F), $L^5$ represents a divalent group which is one selected from the first group consisting of an alkylene group having 1 to 18 carbon atoms, an arylene group having 6 to 18 carbon atoms, —O—, —NH—, —S—, and —C(=O)—, a divalent group obtained by combining two or more selected from the first group, or a single bond.

The alkylene group having 1 to 18 carbon atoms as $L^5$ may be linear or may have a branched structure and/or a cyclic structure.

The number of carbon atoms of the alkylene group having 1 to 18 carbon atoms as $L^5$ is preferably in a range of 1 to 12, more preferably in a range of 1 to 6, and still more preferably 1 or 2.

Examples of the arylene group having 6 to 18 carbon atoms include a phenylene group, a naphthylene group, and a tolyl group.

The number of carbon atoms of the arylene group having 6 to 18 carbon atoms as $L^5$ is preferably in a range of 6 to 12 and more preferably in a range of 6 to 10.

As "divalent group obtained by combining two or more selected from the first group" as $L^5$, a divalent group formed by combining at least one of an alkylene group having 1 to 18 carbon atoms or an arylene group having 6 to 18 carbon atoms with at least one of —O—, —NH—, —S—, or —C(=O)— is preferable, and the following group (AO5) or the following group (AO6) is particularly preferable.

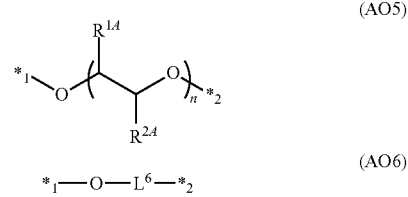

In the group (AO5), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to a carbonyl carbon atom, and *2 represents a bonding position with respect to a non-carbonyl carbon atom.

It is preferable that in a case where one of $R^{1A}$ and $R^{2A}$ represents a methyl group, the other represents a hydrogen atom.

In the group (AO6), $L^6$ represents an alkylene group having 1 to 8 carbon atoms (preferably 1 to 4 carbon atoms and more preferably 1 or 2 carbon atoms), *1 represents a bonding position with respect to a carbonyl carbon atom, and *2 represents the bonding position with respect to a non-carbonyl carbon atom.

$L^5$ represents preferably a single bond, —O—, the group (AO5), or the group (AO6), more preferably a single bond or —O—, and still more preferably —O—.

Hereinafter, specific examples of the structural unit represented by Formula (A) will be shown, but the structural unit represented by Formula (A) is not limited to the following specific examples.

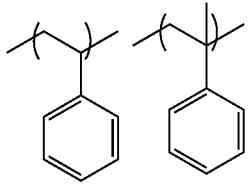

Hereinafter, specific examples of the structural unit represented by Formula (B) will be shown, but the structural unit represented by Formula (B) is not limited to the following specific examples.

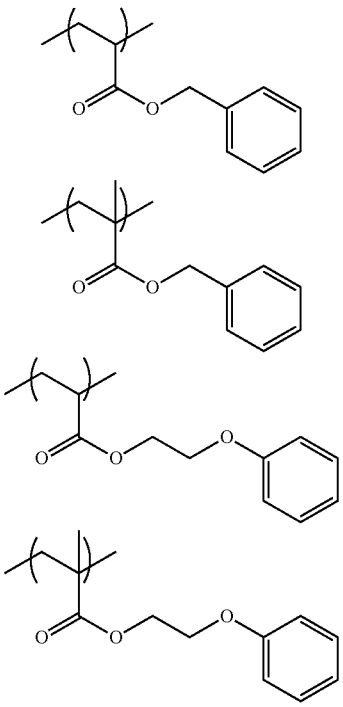

Hereinafter, specific examples of the structural unit represented by Formula (C) will be shown, but the structural unit represented by Formula (C) is not limited to the following specific examples.

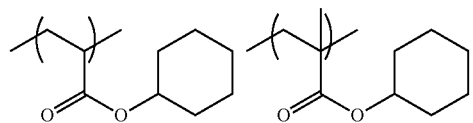

Hereinafter, specific examples of the structural unit represented by Formula (D) will be shown, but the structural unit represented by Formula (D) is not limited to the following specific examples.

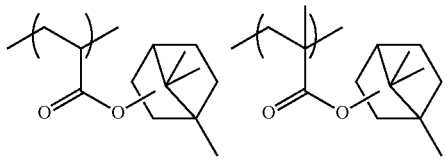

Hereinafter, specific examples of the structural unit represented by Formula (E) will be shown, but the structural unit represented by Formula (E) is not limited to the following specific examples.

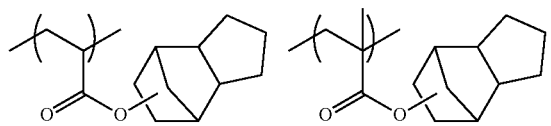

Hereinafter, specific examples of the structural unit represented by Formula (F) will be shown, but the structural unit represented by Formula (F) is not limited to the following specific examples.

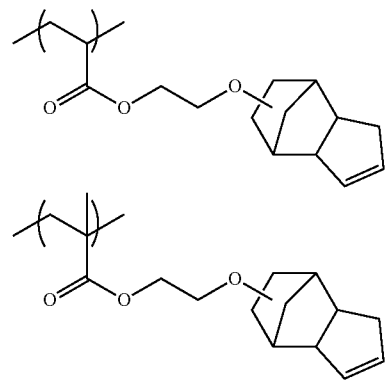

The content of the structural unit derived from the ethylenically unsaturated compound having an aromatic ring structure or an alicyclic structure is preferably in a range of 10% by mass to 90% by mass, more preferably in a range of 20% by mass to 80% by mass, still more preferably in a range of 30% by mass to 70% by mass, and even still more preferably in a range of 30% by mass to 60% by mass with respect to the total amount of the block polymer.

It is also preferable that the structural unit derived from the hydrophobic monomer contains a (meth)acrylate containing an alkyl group having 1 to 20 carbon atoms.

The alkyl group may be any of linear or branched.

Examples of the (meth)acrylate containing an alkyl group having 1 to 20 carbon atoms include methyl (meth)acrylate, ethyl (meth)acrylate, n-propyl (meth)acrylate, n-butyl (meth)acrylate, 2-ethylhexyl (meth)acrylate, and octyl (meth)acrylate.

The content of the structural unit derived from a (meth)acrylate containing an alkyl group having 1 to 20 carbon atoms is preferably in a range of 10% by mass to 90% by mass, more preferably in a range of 20% by mass to 80% by mass, still more preferably in a range of 30% by mass to 70% by mass, and even still more preferably in a range of 40% by mass to 60% by mass with respect to the total amount of the block polymer.

Examples of the anionic group in the structural unit derived from an anionic group-containing monomer include a carboxy group, a salt of the carboxy group, a sulfo group, a salt of the sulfo group, a phosphoric acid group, a salt of the phosphoric acid group, a phosphonic acid group, and a salt of the phosphonic acid group.

Examples of a counterion in a salt include an alkali metal ion such as a sodium ion, a potassium ion, or a lithium ion, an alkaline earth metal ion such as a calcium ion or a magnesium ion, and an ammonium ion.

Among these, a carboxy group or a salt of the carboxy group is preferable as the anionic group. Examples of the anionic group-containing monomer include (meth)acrylic acid, β-carboxyethyl acrylate, fumaric acid, itaconic acid, maleic acid, and crotonic acid.

Among these, (meth)acrylic acid is preferable as the anionic group-containing monomer.

The content of the structural unit derived from the anionic group-containing monomer is preferably in a range of 1% by mass to 30% by mass, more preferably in a range of 2% by mass to 25% by mass, and still more preferably in a range of 3% by mass to 20% by mass with respect to the total amount of the block polymer.

Further, from the viewpoint of suppressing breakage of an image to be recorded and improving the image quality of the image to be recorded, the acid value of the block polymer is preferably in a range of 8 mgKOH/g to 300 mgKOH/g, more preferably in a range of 20 mgKOH/g to 250 mgKOH/g, still more preferably in a range of 80 mgKOH/g to 200 mgKOH/g, and particularly preferably in a range of 100 mgKOH/g to 150 mgKOH/g. In a case where the acid value of the block polymer is 20 mgKOH/g or greater, the image quality of the image to be recorded is more excellent. Further, in a case where the acid value of the block polymer is 250 mgKOH/g or less, breakage of the image to be recorded is further suppressed.

The weight-average molecular weight (Mw) of the block polymer is not particularly limited, but is preferably in a range of 3,000 to 100,000, more preferably in a range of 4,000 to 80,000, and still more preferably in a range of 5,000 to 60,000 from the viewpoint of the dispersibility of the pigment.

—Polymer Having Crosslinked Structure—

The polymer having a crosslinked structure is not particularly limited as long as the polymer is a polymer having at least one crosslinked structure in a molecule.

The polymer having a crosslinked structure (hereinafter, also referred to as "crosslinked polymer") is formed by, for example, crosslinking an uncrosslinked polymer with a crosslinking agent.

It is preferable that the uncrosslinked polymer is a water-soluble polymer.

In the present disclosure, the term "water-soluble" denotes a property that the amount of a substance to be dissolved in 100 g of distilled water at 25° C. is 1 g or greater.

As "water-soluble", a property that the amount of a substance to be dissolved in distilled water at 25° C. is 2 g or greater is preferable, a property that the amount thereof is 5 g or greater is more preferable, and a property that the amount thereof is 10 g or greater is still more preferable.

Examples of the uncrosslinked polymer include polyvinyl, polyurethane, and polyester. Among these, polyvinyl is preferable as the uncrosslinked polymer.

It is preferable that the uncrosslinked polymer is a polymer containing a functional group that can be crosslinked by a crosslinking agent. Examples of the crosslinkable functional group include a carboxy group or a salt thereof, an isocyanate group, and an epoxy group.

Among these, from the viewpoint of improving the dispersibility of the white pigment, a carboxy group or a salt thereof is preferable, and a carboxy group is particularly preferable as the crosslinkable functional group. That is, a polymer containing a carboxy group is preferable as the uncrosslinked polymer.

It is preferable that the uncrosslinked polymer is a copolymer having a structural unit derived from a monomer containing a carboxy group (hereinafter, referred to as "carboxy group-containing monomer"). The structural unit derived from a carboxy group-containing monomer contained in a copolymer may be used alone or two or more kinds thereof. The copolymer may be a random copolymer or a block copolymer, but is preferably a random copolymer.

Examples of the carboxy group-containing monomer include (meth)acrylic acid, β-carboxyethyl acrylate, fumaric acid, itaconic acid, maleic acid, and crotonic acid.

From the viewpoints of the crosslinking properties and the dispersibility, (meth)acrylic acid or β-carboxyethyl acrylate is preferable, and (meth)acrylic acid is more preferable as the carboxy group-containing monomer.

The content of the structural unit derived from the carboxy group-containing monomer, which can be contained in the uncrosslinked polymer, is preferably in a range of 1% by mass to 30% by mass, more preferably in a range of 2% by mass to 25% by mass, and still more preferably in a range of 3% by mass to 20% by mass with respect to the total amount of the block polymer.

It is preferable that the uncrosslinked polymer has a structural unit derived from a hydrophobic monomer in addition to the structural unit derived from a carboxy group-containing monomer.

The structural unit derived from a hydrophobic monomer may be used alone or two or more kinds thereof.

Examples of the structural unit derived from a hydrophobic monomer that can be contained in an uncrosslinked polymer include a structural unit derived from an ethylenically unsaturated compound having an aromatic ring structure or an alicyclic structure, and a structural unit derived from a (meth)acrylate containing an alkyl group having 1 to 20 carbon atoms.

The preferable aspects of these structural units that can be contained in an uncrosslinked polymer are the same as the preferable aspects of these structural units that can be contained in a block polymer.

The content of the structural unit derived from a hydrophobic monomer in the uncrosslinked polymer is preferably in a range of 35% by mass to 95% by mass, more preferably in a range of 50% by mass to 95% by mass, and still more preferably in a range of 70% by mass to 90% by mass with respect to the total amount of the uncrosslinked polymer.

Similarly, the content of the structural unit derived from a hydrophobic monomer in the crosslinked polymer is preferably in a range of 35% by mass to 95% by mass, more preferably in a range of 50% by mass to 95% by mass, and still more preferably in a range of 70% by mass to 90% by mass with respect to the total amount of the crosslinked polymer.

The uncrosslinked polymer and the crosslinked polymer may each have, as the structural unit derived from a hydrophobic monomer, a (meth)acrylate constitutional unit having a benzene ring and a (meth)acrylate constitutional unit containing an alkyl group having 12 or more carbon atoms.

The content of the (meth)acrylate constitutional unit having a benzene ring is preferably in a range of 20% by mass to 60% by mass with respect to the total amount of the polymer (that is, the uncrosslinked polymer or the crosslinked polymer).

The content of the (meth)acrylate constitutional unit containing an alkyl group having 12 or more carbon atoms is preferably in a range of 10% by mass to 40% by mass with respect to the total amount of the polymer (that is, the uncrosslinked polymer or the crosslinked polymer).

From the viewpoint of the dispersibility of the pigment, the acid value of the uncrosslinked polymer is preferably in a range of 67 mgKOH/g to 200 mgKOH/g and more preferably in a range of 67 mgKOH/g to 150 mgKOH/g. In the present disclosure, the acid value is a value measured by the method described in JIS K0070: 1992.

Further, from the viewpoint of suppressing breakage of an image to be recorded and improving the image quality of the image to be recorded, the acid value of the crosslinked polymer is preferably in a range of 35 mgKOH/g to 185 mgKOH/g, more preferably in a range of 50 mgKOH/g to 150 mgKOH/g, and still more preferably in a range of 80 mgKOH/g to 130 mgKOH/g. In a case where the acid value of the crosslinked polymer is 50 mgKOH/g or greater, the image quality of an image to be recorded is more excellent. Further, in a case where the acid value of the crosslinked polymer is 150 mgKOH/g or less, breakage of an image to be recorded is further suppressed.

The weight-average molecular weight (Mw) of the uncrosslinked polymer is not particularly limited, but is preferably in a range of 3,000 to 100,000, more preferably in a range of 4,000 to 80,000, still more preferably in a range of 5,000 to 60,000, and even still more preferably in a range of 10,000 to 60,000 from the viewpoint of the dispersibility of the pigment.

The preferable ranges of the weight-average molecular weight (Mw) of the crosslinked polymer are the same as the preferable ranges of the weight-average molecular weight (Mw) of the uncrosslinked polymer.

It is preferable that the crosslinking agent used in a case of crosslinking the uncrosslinked polymer is a compound having two or more reaction sites with the uncrosslinked polymer (for example, a polymer containing a carboxy group). The crosslinking agent may be used alone or in combination of two or more kinds thereof.

As a combination of the crosslinking agent and the uncrosslinked polymer, a combination of a compound containing two or more epoxy groups (that is, a bifunctional or higher functional epoxy compound) and a polymer containing a carboxy group is preferable. In this combination, a crosslinked structure is formed by the reaction between the epoxy group and the carboxy group. It is preferable that the crosslinked structure is formed by the crosslinking agent after the pigment is dispersed by the uncrosslinked polymer.

Examples of the bifunctional or higher functional epoxy compound include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, and trimethylolpropane triglycidyl ether.

Among these, polyethylene glycol diglycidyl ether, diethylene glycol diglycidyl ether, or trimethylolpropane triglycidyl ether is preferable as the bifunctional or higher functional epoxy compound.

Commercially available products may be used as the crosslinking agent.

Examples of the commercially available products include Denacol EX-321, EX-821, EX-830, EX-850, and EX-851 (manufactured by Nagase ChemteX Corporation).

From the viewpoints of the crosslinking reaction rate and the dispersion stability after crosslinking, the molar ratio between a reaction site (for example, an epoxy group) in the crosslinking agent and a reaction site (for example, a carboxy group) in the uncrosslinked polymer is preferably in a range of 1:1.1 to 1:10, more preferably in a range of 1:1.1 to 1:5, and still more preferably in a range of 1:1.1 to 1:3.

(Water)

The ink contains water.

The content of water is preferably 30% by mass or greater, more preferably 40% by mass or greater, still more preferably 50% by mass or greater, and even still more preferably 60% by mass or greater with respect to the total amount of the ink.

The upper limit of the content of water is appropriately determined according to the content of other components. The upper limit of the content of water may be 90% by mass, 80% by mass, or the like.

(Water-Soluble Organic Solvent)

It is preferable that the ink contains at least one water-soluble organic solvent.

The content of the water-soluble organic solvent is preferably in a range of 5% by mass to 60% by mass, more preferably in a range of 10% by mass to 40% by mass, and still more preferably in a range of 15% by mass to 30% by mass with respect to the total amount of the ink.

—Solvent S1—

It is preferable that the ink contains at least one of the following solvents S1.

The solvent S1 is a water-soluble organic solvent having a contact angle of 85° or less with respect to the jetting surface (that is, the nozzle surface) in the ink jet head.

In a case where the ink contains the solvent S1, the ink adhesion rate after the dripping property test is easily set to 40% by area or less, and thus the continuous jettability of the ink is further improved.

The reason why such an effect can be obtained is considered to be that in a case where the ink contains the solvent S1 that easily adapts to the jetting surface, the solvent S1 is likely to be aligned on the jetting surface side in the ink adhered to the jetting surface, and thus the dripping property of the ink from the jetting surface is improved.

Here, the contact angle denotes a contact angle 1 minute after the start of contact between a liquid droplet of a solvent and the jetting surface, which is measured in conformity with the method described in JIS R 3257: 1999. The liquid droplet amount of the solvent is set to 2 µL.

As the measuring device, for example, a contact angle meter Drop Master DM700 (manufactured by Kyowa Interface Science Co., Ltd.) is used.

The content of the solvent S1 is preferably in a range of 0.1% by mass to 10% by mass with respect to the total amount of the ink.

In this manner, the ink adhesion rate after the dripping property test is more likely to be decreased, and as a result, the continuous jettability of the ink is further improved.

The lower limit of the content of the solvent S1 is more preferably 0.5% by mass and still more preferably 1% by mass with respect to the total amount of the ink.

The upper limit of the content of the solvent S1 is more preferably 8% by mass and still more preferably 5% by mass with respect to the total amount of the ink.

Examples of the solvent S1 include ethylene glycol monomethyl ether, ethylene glycol monoethyl ether, ethylene glycol monopropyl ether, ethylene glycol monobutyl ether, ethylene glycol monohexyl ether, propylene glycol monomethyl ether, propylene glycol monoethyl ether, propylene glycol monopropyl ether, propylene glycol monobutyl ether, diethylene glycol monoethyl ether, diethylene glycol monobutyl ether, diethylene glycol monohexyl ether, dipropylene glycol monomethyl ether, triethylene glycol monobutyl ether, tripropylene glycol, 2-ethyl-1-hexanol, 1-pentanol, 1-hexanol, 1-octanol, 1,2-hexanediol, 3-methoxy-3-methyl-1-butanol, 3-methoxy-3-methyl-1-butyl acetate, 3-methyl-1,3-butanediol, 2-dimethylaminoethanol, and 2-amino-2-methyl-1-propanol.

It is preferable that the solvent S1 contains at least one water-soluble organic solvent (hereinafter, also referred to as "solvent S1A") having a contact angle of 80° or less with respect to the jetting surface.

The proportion of the solvent S1A in the solvent S1 is preferably 50% by mass or greater, more preferably 60% by mass or greater, and still more preferably 80% by mass or greater.

Examples of the solvent S1A include ethylene glycol monopropyl ether, ethylene glycol monobutyl ether, ethylene glycol monohexyl ether, propylene glycol monomethyl ether, propylene glycol monoethyl ether, propylene glycol monopropyl ether, propylene glycol monobutyl ether, diethylene glycol monoethyl ether, diethylene glycol monobutyl ether, diethylene glycol monohexyl ether, diethylene glycol monohexyl ether, dipropylene glycol monomethyl ether, triethylene glycol monobutyl ether, 2-ethyl-1-hexanol, 1-pentanol, 1-hexanol, 1-octanol, 1,2-hexanediol, 3-methoxy-3-methyl-1-butanol, 3-methoxy-3-methyl-1-butyl acetate, and 2-dimethylaminoethanol.

It is preferable that the solvent S1 contains at least one water-soluble organic solvent (hereinafter, also referred to as "solvent S1B") having a contact of 75° or less angle with respect to the jetting surface.

The contact angle of the solvent S1B is preferably less than 75°.

The proportion of the solvent S1B in the solvent S1 is preferably 50% by mass or greater, more preferably 60% by mass or greater, and still more preferably 80% by mass or greater.

Examples of the solvent S1B include ethylene glycol monopropyl ether, ethylene glycol monobutyl ether, ethylene glycol monohexyl ether, propylene glycol monomethyl ether, propylene glycol monoethyl ether, propylene glycol monopropyl ether, propylene glycol monobutyl ether, dipropylene glycol monomethyl ether, 1-pentanol, 1-hexanol, 1-octanol, 1,2-hexanediol, 3-methoxy-3-methyl-1-butyl acetate, and 2-dimethylaminoethanol.

It is preferable that the solvent S1 contains at least one alkylene glycol monoalkyl ether.

The proportion of the alkylene glycol monoalkyl ether in the solvent S1 is preferably 50% by mass or greater, more preferably 60% by mass or greater, and still more preferably 80% by mass or greater.

As the alkylene glycol monoalkyl ether, ethylene glycol monomethyl ether, ethylene glycol monoethyl ether, ethylene glycol monopropyl ether, ethylene glycol monobutyl ether, ethylene glycol monohexyl ether, propylene glycol monomethyl ether, propylene glycol monoethyl ether, propylene glycol monopropyl ether, propylene glycol monobutyl ether, diethylene glycol monoethyl ether, diethylene glycol monobutyl ether, diethylene glycol monohexyl ether, dipropylene glycol monomethyl ether, or triethylene glycol monobutyl ether is preferable, the solvent S1A such as ethylene glycol monopropyl ether, ethylene glycol monobutyl ether, ethylene glycol monohexyl ether, propylene glycol monomethyl ether, propylene glycol monoethyl ether, propylene glycol monopropyl ether, propylene glycol monobutyl ether, diethylene glycol monoethyl ether, diethylene glycol monobutyl ether, diethylene glycol monohexyl ether, dipropylene glycol monomethyl ether, or triethylene glycol monobutyl ether is more preferable, and the solvent S1B such as ethylene glycol monopropyl ether, ethylene glycol monobutyl ether, ethylene glycol monohexyl ether, propylene glycol monomethyl ether, propylene glycol monoethyl ether, propylene glycol monopropyl ether, propylene glycol monobutyl ether, or dipropylene glycol monomethyl ether is still more preferable.

From the viewpoint of further decreasing the ink adhesion rate after the dripping property test and further improving the continuous jettability of the ink, the solvent S1 contains preferably at least one selected from the group X consisting of ethylene glycol monopropyl ether, ethylene glycol monobutyl ether, propylene glycol monomethyl ether, propylene glycol monoethyl ether, propylene glycol monopropyl ether, propylene glycol monobutyl ether, and dipropylene glycol monomethyl ether and more preferably at least two selected from the group X.

Preferred examples of a combination of two solvents from among these include a combination of propylene glycol monopropyl ether and dipropylene glycol monomethyl ether and a combination of ethylene glycol monobutyl ether and propylene glycol monoethyl ether.

—Water-Soluble Organic Solvent Having Boiling Point of Lower than 220° C.—

The ink may contain at least one water-soluble organic solvent having a boiling point of lower than 220° C.

In this manner, the drying properties of the ink (that is, the drying properties of an image to be recorded) are further improved.

In the present disclosure, the boiling point denotes a boiling point at 1 atm (101,325 Pa).

The water-soluble organic solvent having a boiling point of lower than 220° C. may or may not correspond to the solvent S1.

Examples of the water-soluble organic solvent having a boiling point of lower than 220° C. include 1,2-propanediol (also referred to as propylene glycol; PG) (boiling point of 188° C.), 1,3-propanediol (boiling point of 213° C.), propylene glycol monomethyl ether (boiling point of 121° C.), ethylene glycol (boiling point of 197° C.), ethylene glycol monomethyl ether (boiling point of 124° C.), propylene glycol monoethyl ether (boiling point of 133° C.), ethylene glycol monoethyl ether (boiling point of 135° C.), propylene glycol monopropyl ether (boiling point of 149° C.), ethylene glycol monopropyl ether (boiling point of 151° C.), propylene glycol monobutyl ether (boiling point of 170° C.), ethylene glycol monobutyl ether (boiling point of 171° C.), 2-ethyl-1-hexanol (boiling point of 187° C.), dipropylene glycol monomethyl ether (boiling point of 188° C.), diethylene glycol dimethyl ether (boiling point of 162° C.), diethylene glycol diethyl ether (boiling point of 188° C.), and dipropylene glycol dimethyl ether (boiling point of 175° C.).

In a case where the ink contains a water-soluble organic solvent having a boiling point of lower than 220° C., the content of the water-soluble organic solvent having a boiling point of lower than 220° C. is preferably in a range of 1% by mass to 50% by mass, more preferably in a range of 5% by mass to 40% by mass, still more preferably in a range of 10% by mass to 40% by mass, and even still more preferably in a range of 15% by mass to 35% by mass with respect to the total amount of the ink.

—Water-Soluble Organic Solvent Having Boiling Point of 220° C. or Higher—

The content of the water-soluble organic solvent having a boiling point of 220° C. or higher (hereinafter, also referred to as "high-boiling point solvent") in the ink is preferably 5% by mass or less. In this manner, the drying properties of the ink (that is, the drying properties of an image to be recorded) are further improved.

Here, the expression "the content of the water-soluble organic solvent having a boiling point of 220° C. or higher in the ink is 5% by mass or less" denotes that the ink does not contain the water-soluble organic solvent having a boiling point of 220° C. or higher (that is, the content of the water-soluble organic solvent having a boiling point of 220° C. or higher in the ink is 0% by mass) or even in a case where the ink contains the water-soluble organic solvent having a boiling point of 220° C. or higher, the content of the water-soluble organic solvent having a boiling point of 220° C. or higher is 5% by mass or less with respect to the total amount of the ink.

The content of the water-soluble organic solvent having a boiling point of 220° C. or higher in the ink is more preferably 3% by mass or less, still more preferably 2% by mass or less, even still more preferably 1% by mass or less, and even still more preferably 0% by mass.

Examples of the water-soluble organic solvent having a boiling point of 220° C. or higher include glycerin (boiling point of 290° C.), 1,2-hexanediol (HDO) (boiling point of 223° C.), diethylene glycol (boiling point of 245° C.), diethylene glycol monobutyl ether (boiling point of 230° C.), triethylene glycol (boiling point of 285° C.), dipropylene glycol (boiling point of 232° C.), tripropylene glycol (boiling point 267° C.), trimethylolpropane (boiling point of 295° C.), 2-pyrrolidone (boiling point of 245° C.), tripropylene glycol monomethyl ether (boiling point of 243° C.), and triethylene glycol monomethyl ether (boiling point of 248° C.).

(Resin Particles)

It is preferable that the ink contains at least one kind of resin particles.

In a case where the ink contains resin particles, the adhesiveness of the image to be recorded is further improved.

Here, the resin particles are distinguished from the polymer dispersant in terms that the resin particles are particles consisting of a resin.

A water-insoluble resin is preferable as the resin constituting the resin particles.

Further, in the case where the ink contains resin particles, an increase in viscosity of the ink is further suppressed as compared with a case where the ink contains the same mass of a water-soluble resin as the mass of the resin particles. As a result, the jettability (hereinafter, also simply referred to as "jettability of the ink") of the ink from an ink jet head in a case of using the ink as an ink jet ink is further improved.

The definition and the preferable range of "water soluble" are as described above.

The term "water insoluble" denotes a property that the amount of a substance to be dissolved in 100 g of distilled water at 25° C. is less than 1 g.

The glass transition temperature of the resin particles (that is, the glass transition temperature of the resin in the resin particles) is not particularly limited.

From the viewpoint of further improving the strength of the image, the glass transition temperature (Tg) of the resin particles is preferably 20° C. or higher, more preferably 50° C. or higher, and still more preferably 80° C. or higher.

From the viewpoint of the manufacturing suitability of the resin particles, the glass transition temperature (Tg) of the resin particles is preferably 200° C. or lower, more preferably 150° C. or lower, and still more preferably 130° C. or lower.

As the resin particles, particles consisting of an acrylic resin (hereinafter, also referred to as acrylic resin particles), particles consisting of a polyester resin (hereinafter, also referred to as polyester resin particles), particles consisting of a polyurethane resin (hereinafter, also referred to as polyurethane resin particles), or particles consisting of a polyolefin resin (hereinafter, also referred to as polyolefin resin particles) are preferable.

Further, in the present disclosure, the polyester resin indicates a polymer compound having an ester bond in the main chain. Examples of the polyester resin include a polycondensate of polyvalent carboxylic acid (such as dicarboxylic acid) and polyalcohol (such as a diol).

Further, in the present disclosure, the polyolefin resin indicates a polymer (a homopolymer or a copolymer) of a raw material monomer containing an olefin. Examples of the polyolefin resin include a polymer of one kind of olefin, a copolymer of two or more kinds of olefins, and a copolymer of one or more kinds of olefins and one or more kinds of other monomers. Examples of the olefin include an α-olefin having 2 to 30 carbon atoms.

In the present disclosure, the polyurethane resin indicates a polymer compound having a urethane bond.

From the viewpoint of further improving the adhesiveness and the rub resistance of the image, it is preferable that the resin particles contained in the ink include acrylic resin particles.

In a case where the resin particles contained in the ink include acrylic resin particles, the proportion of the acrylic resin particles in the resin particles contained in the ink is preferably 60% by mass or greater, more preferably 80% by mass or greater, and still more preferably 90% by mass or greater.

In a case where the proportion of the acrylic resin particles in the resin particles contained in the ink is 60% by mass or greater, the adhesiveness of the image is further improved.

As the resin particles, self-dispersing resin particles are preferable.

Examples of the self-dispersing resin particles include self-dispersing polymer particles described in paragraphs 0062 to 0076 of JP2016-188345A and paragraphs 0109 to 0140 of WO2013/180074A.

The resin in the resin particles has preferably an alicyclic structure or an aromatic ring structure and more preferably an alicyclic structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, a norbornane ring structure, an isobornane ring structure, a norbornene ring structure, an isobornene ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

From the viewpoint of further improving the dispersibility of the resin particles in water, it is preferable that the resin contained in the resin particles contains an ionic group in the structure.

The ionic group may be an anionic group or a cationic group, but an anionic group is preferable.

The anionic group is not particularly limited, but a carboxy group, a salt of the carboxy group, a sulfo group, or a salt of the sulfo group is preferable.

As the resin in resin particles, an acrylic resin having at least one selected from the group consisting of a benzyl (meth)acrylate unit, a phenoxyethyl (meth)acrylate unit, and an alicyclic structure-containing (meth)acrylate unit, and a (meth)acrylic acid unit is more preferable, and an acrylic resin having at least one selected from the group consisting of a benzyl (meth)acrylate unit, a phenoxyethyl (meth)acrylate unit, and an alicyclic structure-containing (meth)acrylate unit, a (meth)acrylic acid unit, and an alkyl (meth)acrylate unit that contains an alkyl group having 1 to 4 carbon atoms is still more preferable.

As the alicyclic structure-containing (meth)acrylate, at least one selected from alkyl (meth)acrylate containing a cycloalkyl group having 3 to 10 carbon atoms (such as cyclohexyl (meth)acrylate), isobornyl (meth)acrylate, adamantyl (meth)acrylate, and dicyclopentanyl (meth)acrylate is preferable, and at least one selected from isobornyl (meth)acrylate, adamantyl (meth)acrylate, or dicyclopentanyl (meth)acrylate is more preferable.

From the viewpoint of the self-dispersibility, the aggregating properties in a case of image recording, and the like, the acid value of the resin in the resin particles is preferably in a range of 25 mgKOH/g to 100 mgKOH/g, more preferably in a range of 30 mgKOH/g to 90 mgKOH/g, and still more preferably in a range of 35 mgKOH/g to 80 mgKOH/g.

The molecular weight of the resin in the resin particles is preferably in a range of 1,000 to 300,000, more preferably in a range of 2,000 to 200,000, and still more preferably in a range of 5,000 to 100,000 in terms of the weight-average molecular weight.

The weight-average molecular weight is measured by gel permeation chromatography (GPC). The details of GPC are as described above.

The volume average particle diameter of the resin particles is preferably in a range of 1 nm to 200 nm, more preferably in a range of 3 nm to 200 nm, and still more preferably in a range of 5 nm to 50 nm.

In a case where the ink contains resin particles, the content of the resin particles is preferably in a range of 1% by mass to 25% by mass, more preferably in a range of 2% by mass to 20% by mass, still more preferably in a range of 2% by mass to 15% by mass, and even still more preferably in a range of 2% by mass to 10% by mass with respect to the total amount of the ink.

(Surfactant)

The ink may contain at least one kind of surfactant.

Examples of the surfactant include a nonionic surfactant, a cationic surfactant, an anionic surfactant, and a betaine surfactant.

Preferred examples of the surfactant include an acetylene glycol-based surfactant, which is a kind of a nonionic surfactant.

As the acetylene glycol-based surfactant, for example, the acetylene glycol-based surfactants described in paragraphs 0070 to 0080 of WO2017/149917A can be used.

Examples of the acetylene glycol-based surfactant include a polyalkylene oxide adduct (preferably a polyethylene oxide adduct) of 2,4,7,9-tetramethyl-5-decyne-4,7-diol, a polyalkylene oxide adduct (preferably a polyethylene oxide adduct) of 3,6-dimethyl-4-octyne-3,6-diol, a polyalkylene oxide adduct (preferably a polyethylene oxide adduct) of 2,5,8,11-tetramethyl-6-dodecyne-5,8-diol, and a polyalkylene oxide adduct (preferably a polyethylene oxide adduct) of 2,5-dimethyl-3-hexyne-2,5-diol.

Examples of commercially available products of the acetylene glycol-based surfactant include the SURFYNOL Series (such as SURFYNOL 420, SURFYNOL 440, SURFYNOL 465, and SURFYNOL 485), OLFINE Series (such as OLFINE E1010 and OLFINE E1020), and DYNOL Series (such as DYNOL 604) (all manufactured by Air Products and Chemicals Inc. or Nissin Chemical Co., Ltd.), and ACETYLENOL (manufactured by Kawaken Fine Chemicals Co., Ltd.).

Commercially available products of the acetylene glycol-based surfactants are also provided by The Dow Chemical Company, General Aniline & Film Corporation, and the like.

It is also preferable that the surfactant contains a fluorine-based surfactant.

Examples of a commercially available product of the fluorine-based surfactant include Capstone FS-63 and Capstone FS-61 (manufactured by DuPont), FTERGENT 100, FTERGENT 110, and FTERGENT 150 (manufactured by Neos Co., Ltd.), and CHEMGUARD S-760P (manufactured by Chemguard Inc.).

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

In a case where the ink contains a surfactant, the content of the surfactant in the ink is appropriately adjusted in consideration of the surface tension of the ink.

The content of the surfactant in the ink is preferably in a range of 0.01% by mass to 5% by mass, more preferably in a range of 0.05% by mass to 3% by mass, and still more preferably in a range of 0.1% by mass to 2% by mass with respect to the total amount of the ink.

(Other Components)

The ink may contain components other than the components described above.

Examples of other components include known additives such as a silicic acid compound (such as colloidal silica), urea, a urea derivative, a wax, a fading inhibitor, an emulsion stabilizer, a penetration enhancer, an ultraviolet absorbing agent, a preservative, a fungicide, a pH adjuster, an antifoaming agent, a viscosity adjuster, a dispersion stabilizer, and a chelating agent.

(Preferable Physical Properties of Ink)

The viscosity of the ink is preferably 1.2 mPa·s or greater and 15.0 mPa·s or less, more preferably 2 mPa·s or greater and less than 13 mPa·s, and still more preferably 2.5 mPa·s or greater and less than 10 mPa·s.

The viscosity is a value measured at 25° C. using a viscometer.

As the viscometer, for example, a VISCOMETER TV-22 type viscometer (manufactured by Toki Sangyo Co., Ltd.) can be used.

The surface tension of the ink is preferably 25 mN/m or greater and 40 mN/m or less and more preferably 27 mN/m or greater and 37 mN/m or less.

The surface tension is a value measured at a temperature of 25° C.

The surface tension can be measured using, for example, an Automatic Surface Tensiometer CBVP-Z (manufactured by Kyowa Interface Science Co., Ltd.).

From the viewpoint of the dispersion stability, the pH of the ink at 25° C. is preferably in a range of 6 to 11, more preferably in a range of 7 to 10, and still more preferably in a range of 7 to 9.

The pH of the ink at 25° C. is measured using a commercially available pH meter.

<Ink Applying Step>

The Ink applying step is a step of jetting the ink from the ink jet head in a liquid droplet amount of 1.0 pL or greater to apply the ink onto a base material.

(Base Material)

The base material is not particularly limited, and a known base material can be used.

Examples of the base material include a paper base material, a paper base material on which a resin (such as polyethylene, polypropylene, or polystyrene) is laminated, a resin base material, a metal plate (such as a plate made of a metal such as aluminum, zinc, or copper), a paper base material on which the above-described metal is laminated or vapor-deposited, and a resin base material on which the above-described metal is laminated or vapor-deposited.

Further, examples of the base material also include a textile base material.

Examples of the material of the textile base material include natural fibers such as cotton, silk, hemp, and wool; chemical fibers such as viscose rayon and lyocell; synthetic fibers such as polyester, polyamide, and acryl; and a mixture of at least two selected from the group consisting of natural fibers, chemical fibers, and synthetic fibers. As the textile base material, the textile base material described in paragraphs [0039] to [0042] of WO2015/158592A may be used.

As the base material, an impermeable base material is preferable.

The impermeable base material indicates a base material having a water absorption rate (% by mass, 24 hr.) of less than 0.2 according to ASTMD 570 of the ASTM test method.

The impermeable base material is not particularly limited, but a resin base material is preferable.

The resin base material is not particularly limited, and examples thereof include a thermoplastic resin base material.

Examples of the resin base material include a base material obtained by molding a thermoplastic resin in the form of a sheet or film.

As the resin base material, a base material containing polypropylene, polyethylene terephthalate, nylon, polyethylene, or polyimide is preferable.

The resin base material may be a transparent resin base material or a colored resin base material.

Here, the term "transparent" indicates that the transmittance of visible light having a wavelength of 400 nm to 700 nm is 80% or greater (preferably 90% or greater).

The shape of the resin base material is not particularly limited, but a sheet-shaped resin base material is preferable and a sheet-shaped resin base material which is capable of forming a roll by being wound is more preferable.

The thickness of the resin base material is preferably in a range of 10 µm to 200 µm and more preferably in a range of 10 µm to 100 µm.

The resin base material may be subjected to a surface treatment from the viewpoint of improving the surface energy.

Examples of the surface treatment include a corona treatment, a plasma treatment, a heat treatment, an abrasion treatment, a light irradiation treatment (UV treatment), and a flame treatment, but the surface treatment is not limited thereto.

(Ink Jet Head)

From the viewpoint of obtaining an image with an excellent covering property, the liquid droplet amount of the ink jetted from the jetting hole of the ink jet head is 1.0 pL (picoliter) or greater.

The liquid droplet amount of the ink is preferably 1.5 pL or greater.

The upper limit of the liquid droplet amount of the ink is preferably 10 µL and more preferably 6 pL.

In the ink jet head, the diameter of the jetting hole (that is, the nozzle diameter) from which the ink is jetted is preferably 20 m or less.

In a case where the diameter of the jetting hole is 20 µm or less, a finer image can be recorded.

Further, typically, in a case where the diameter of the jetting hole is 20 µm or less, the continuous jettability of the ink tends to decrease. However, in the image recording method of the present disclosure, excellent continuous jettability is realized even in a case where the diameter of the jetting hole is 20 µm or less.

The diameter of the jetting hole is more preferably 18 µm.

The lower limit of the diameter of the jetting hole is not particularly limited, and the lower limit thereof may be set to 10 µm, 11 µm, 12 µm, or the like.

The resolution of the ink jet head is preferably 300 dpi or greater, more preferably 600 dpi, and still more preferably 800 dpi.

Here, dpi stands for dot per inch, and 1 inch is 2.54 cm.

As the method of allowing the ink to be jetted from the ink jet head, for example, an electric charge control method of allowing an ink to be jetted using an electrostatic attraction force; a drop-on-demand method (pressure pulse method) using a vibration pressure of a piezoelectric element; an acoustic ink jet method of allowing an ink to be jetted using a radiation pressure by converting an electric signal into an acoustic beam and irradiating the ink with the acoustic beam; and a thermal ink jet (bubble jet (registered trademark)) method of heating an ink to form bubbles and utilizing the generated pressure can be used.

Further, as the method of allowing the ink to be jetted from the ink jet head, for example, a method described in JP1979-59936A (JP-S54-59936A), in which an ink is jetted from a nozzle using an action force caused by a rapid change in volume of the ink after being subjected to an action of thermal energy can also be used.

Further, as the method of allowing the ink to be jetted from the ink jet head, a method described in paragraphs 0093 to 0105 of JP2003-306623A can also be used.

For example, an ink jet head having a plurality of jetting holes and having a jetting surface on which a liquid-repellent film is provided can be used.

In regard to such an ink jet head, for example, known documents such as JP5775485B can be referred to.

The liquid-repellent film in the ink jet head contains preferably a fluorine compound, more preferably a compound containing an alkyl fluoride group, and still more preferably perfluoroalkyl ether.

The thickness of the liquid-repellent film is not particularly limited, but is preferably in a range of 0.2 nm to 30 nm and more preferably in a range of 0.4 nm to 20 nm.

A commercially available product may be used as the ink jet head.

Examples of the commercially available product include an ink jet head "KM1800i" (manufactured by Konica Minolta, Inc.), an ink jet head "KJ 4A-AA" (manufactured by Kyocera Corporation), and an ink jet head "Samba G3L" (manufactured by FUJIFILM Dimatix, Inc.).

—Ink Applying Method—

The ink applying method may be any of a single pass method or a scanning method, but the single pass method is preferable from the viewpoint of the image recording speed.

Here, the single pass method is a method of fixing and disposing a line head, using a line head in which jetting holes (nozzles) corresponding to the entire region on one side of the base material are aligned as an ink jet head, and applying the ink onto the base material during the transport of the base material in a direction intersecting the direction in which the jetting holes of the line head are aligned.

Meanwhile, the scanning method is a method of allowing a short serial head on the base material to apply the ink using a short serial head as the ink jet head.

In the image recording carried out using the single pass method (that is, the application of the ink), excellent continuous jettability is typically required.

According to the image recording method of the present disclosure, the above-described requirements for image recording using the single pass method are satisfied.

In the ink applying step, an image may be obtained by heating and drying the ink which has been applied onto the base material.

Examples of the means for heating and drying the ink include known heating means such as a heater, known air blowing means such as a dryer, and means for combining these.

Examples of the method for heating and drying the ink include a method of applying heat using a heater or the like from a side of the base material opposite to the surface onto which the ink has been applied; a method of applying warm air or hot air to the surface of the base material onto which the ink has been applied; a method of applying heat using an infrared heater from the surface of the base material onto which the ink has been applied or from a side of the base material opposite to the surface onto which the ink has been applied; and a method of combining a plurality of these methods.

The heating temperature of heating and drying the ink is preferably 55° C. or higher, more preferably 60° C. or higher, and particularly preferably 65° C. or higher. The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

Further, the base material may be heated in advance before the application of the ink.

The heating temperature may be appropriately set, but the temperature of the base material is set to be preferably in a range of 20° C. to 50° C. and more preferably in a range of 25° C. to 40° C.

<Other Steps>

The image recording method of the present disclosure may include other steps in addition to the ink preparing step and the ink applying step.

Examples of the other steps include a pretreatment liquid applying step of applying a pretreatment liquid containing an aggregating agent and water onto a base material, which is a step provided before the ink applying step.

In a case where the image recording method of the present disclosure includes the pretreatment liquid applying step, the ink is applied onto a region of the base material where the pretreatment liquid has been applied, in the ink applying step.

In regard to the pretreatment liquid applying step, known documents such as WO2019/004485A and WO2019/163581A can be appropriately referred to.

The aggregating agent contained in the pretreatment liquid is preferably at least one selected from the group consisting of a polyvalent metal compound, an organic acid, a metal complex, and a cationic polymer and more preferably contains an organic acid.

The application of the pretreatment liquid in the pretreatment liquid applying step can be performed by employing a known application method such as a coating method, an ink jet recording method, or a dipping method.

Examples of the coating method include known coating methods using a bar coater, an extrusion die coater, an air doctor coater, a blade coater, a rod coater, a knife coater, a squeeze coater, and a reverse roll coater.

In the pretreatment liquid applying step, the pretreatment liquid applied onto the base material may be heated and dried.

The preferable methods and the preferable conditions for heating and drying are the same as the preferable methods and the preferable conditions for heating and drying the ink that can be carried out in the ink applying step.

[Pigment Dispersion]

Hereinafter, a pigment dispersion according to another aspect of the present disclosure (hereinafter, also referred to as "pigment dispersion X") will be described.

The pigment dispersion X includes water, a white pigment, a polymer dispersant, and a water-soluble organic solvent (X) which is an alkylene glycol monoalkyl ether.

It is preferable that the pigment dispersion X is an ink.

According to the pigment dispersion X, the same effects as those of the image recording method of the present disclosure are exhibited.

Further, the pigment dispersion X can be suitably used as the ink in the image recording method of the present disclosure.

The preferable aspects of the pigment dispersion X are the same as the preferable aspects of the ink described in the section of "ink preparing step" in the image recording method of the present disclosure described above.

One preferable aspect of the pigment dispersion X is a pigment dispersion containing water, a white pigment containing titanium dioxide particles, a polymer dispersant containing a block polymer or a polymer having a cross-linked structure, and at least one water-soluble organic solvent (X) selected from the group X consisting of ethylene glycol monopropyl ether, ethylene glycol monobutyl ether, propylene glycol monomethyl ether, propylene glycol monoethyl ether, propylene glycol monopropyl ether, propylene glycol monobutyl ether, and dipropylene glycol monomethyl ether.

The content of the water-soluble organic solvent (X) is preferably in a range of 0.1% by mass to 10% by mass with respect to the total amount of the pigment dispersion X.

In this manner, the continuous jettability in a case where the pigment dispersion X is used as the ink is further improved.

The lower limit of the content of the water-soluble organic solvent (X) is more preferably 0.5% by mass and still more preferably 1% by mass with respect to the total amount of the pigment dispersion X.

The upper limit of the content of the water-soluble organic solvent (X) is more preferably 8% by mass with respect to the total amount of the pigment dispersion X.

It is preferable that the pigment dispersion X contains at least one water-soluble organic solvent having a boiling point of lower than 220° C.

In this manner, the drying properties in a case where the pigment dispersion X is used as the ink (that is, the drying properties of an image to be recorded) are further improved.

The water-soluble organic solvent having a boiling point of lower than 220° C. may or may not correspond to the water-soluble organic solvent (X).

Specific examples of the water-soluble organic solvent having a boiling point of lower than 220° C. are as described in the section of "ink preparing step" in the image recording method of the present disclosure described above.

The preferable ranges of the content of the water-soluble organic solvent having a boiling point of lower than 220° C. with respect to the total amount of the pigment dispersion X are the same as the preferable ranges of the content of the water-soluble organic solvent having a boiling point of lower than 220° C. with respect to the total amount of the ink, described in the section of "ink preparing step" above.

The preferable ranges of the content of the water-soluble organic solvent having a boiling point of 220° C. or higher with respect to the total amount of the pigment dispersion X are the same as the preferable ranges of the content of the water-soluble organic solvent having a boiling point of 220° C. or higher with respect to the total amount of the ink, described in the section of "ink preparing step" above.

EXAMPLES

Hereinafter, examples of the present disclosure will be described below, but the present disclosure is not limited to the following examples.

In the description below, "water" indicates ion exchange water unless otherwise specified.

Example 1

Synthesis of Polymer Dispersant (Block Polymer 1)

A block polymer 1 serving as a polymer dispersant was synthesized with reference to Synthesis Example 8 of JP2015-83688A. Details are described below.

Diethylene glycol dimethyl ether (266 parts by mass; polymerization solvent), 2-iodo-2-cyanopropane (6.2 parts by mass; polymerization initiation compound), methyl methacrylate (MMA) (120 parts by mass; monomer), acrylic acid (AA) (28.8 parts by mass; monomer), cyclohexyl methacrylate (CHMA) (67.2 parts by mass; monomer), azobisdimethylisovaleronitrile (hereinafter, abbreviated as "V-65"; radical generator) (7.9 parts by mass), and 2-t-Butyl-4,6-dimethylphenol (0.7 parts by mass; catalyst) were added to a 1 L separable flask reactor equipped with a stirrer, a backflow condenser, a thermometer, and a nitrogen introduction pipe, and the mixture was stirred while nitrogen was allowed to flow.

Next, the temperature (reaction temperature) of the mixture in the reactor was increased to 70° C., and the mixture was polymerized for 3 hours, thereby obtaining a polymerization solution A containing an MMA/AA/CHMA copolymer.

After 3 hours, as a result of sampling a part of the polymerization solution A and measuring the solid content, the solid content was 42.0% by mass, and thus it was confirmed that most of the monomers were polymerized.

Further, in a case where the molecular weight of the MMA/AA/CHMA copolymer was measured by GPC, the weight-average molecular weight (Mw) was 7,500.

The acid value of this MMA/AA/CHMA copolymer was 101.0 mgKOH/g.

Next, a mixture of benzyl methacrylate (BzMA) (35.2 parts by mass; monomer) and V-65 (0.3 parts by mass; radical generator) was added to the polymerization solution A described above, and the mixture was polymerized at 70° C. for 3 hours, thereby obtaining a polymerization solution B containing the block polymer 1 as a polymer dispersant.

Here, the block polymer 1 is a block polymer containing an A block which is an MMA/AA/CHMA copolymer and a B block which is a BzMA homopolymer.

As a result of measurement of the solid content in the obtained polymerization solution B, the solid content thereof was 43.2% by mass and it was confirmed that most of the monomers were polymerized.

Further, the Mw of the block polymer 1 was 8,500.

The acid value of the block polymer 1 was 89.3 mgKOH/g.

<Preparation of White Pigment Dispersion Liquid>

A mixture consisting of the white pigment 1 (20 parts by mass), the block polymer (18.5 parts by mass in terms of solid content) as a polymer dispersant, and water (61.5 parts by mass) was prepared by mixing the polymerization solution B, the white pigment 1 ("R-930", manufactured by Ishihara Sangyo Kaisha, Ltd., titanium dioxide pigment), and water.

The obtained mixture was subjected to a dispersion treatment for 4 hours using φ1 mm zirconia beads and a paint conditioner, and coarse particles were removed by filtration, thereby obtaining a white pigment paste.

28% by mass of ammonia water (2.4 parts) and water (3.6 parts by mass) were added to 100 parts by mass of the obtained white pigment paste, and the mixture was stirred with a high-speed disper, thereby obtaining a white pigment dispersion liquid (white pigment concentration of 50.1% by mass, concentration of solid contents of 52.6% by mass).

<Preparation of Dispersion Liquid of Resin Particles P1>

A dispersion liquid of resin particles P1 serving as one of the components in the ink was prepared. Hereinafter, the details will be described.

A 2 L three-neck flask (reaction container) provided with a stirrer, a thermometer, a reflux condenser, and a nitrogen gas introduction pipe was charged with 560.0 g of methyl ethyl ketone, and the solution was heated to 87° C. Next, a mixed solution consisting of 220.4 g of methyl methacrylate, 301.6 g of isobornyl methacrylate, 58.0 g of methacrylic acid, 108 g of methyl ethyl ketone, and 2.32 g of "V-601" (manufactured by FUJIFILM Wako Pure Chemical Corporation, polymerization initiator, dimethyl 2,2'-azobis(2-methyl propionate) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1): A solution consisting of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601," and 6.4 g of methyl ethyl ketone was added to the solution, and the resulting solution was stirred for 3 hours (the operation carried out so far is referred to as the "reaction").

After completion of the reaction, the temperature of the solution was lowered to 65° C., 163.0 g of isopropanol was added thereto, and the solution was allowed to be naturally cooled, thereby obtaining a polymerization solution containing a copolymer (concentration of solid contents of 41.0% by mass).

Next, 317.3 g of the obtained polymerization solution was weighed, 46.4 g of isopropanol, 1.65 g of a 20 mass % maleic acid anhydride aqueous solution (water-soluble acidic compound, corresponding to 0.3% by mass as maleic acid with respect to the copolymer), and 40.77 g of a 2 mol/L sodium hydroxide (NaOH) aqueous solution were added to the solution, and the temperature of the liquid in the reaction container was increased to 70° C.

Next, 380 g of distilled water was added dropwise to the liquid which had been heated to 70° C., at a speed of 10 mL/min, to carry out dispersion in water (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm by mass as benzisothiazolin-3-one with respect to solid content of polymer) of PROXEL GXL (S) (manufactured by Arch Chemicals, Inc.) was added to the obtained liquid.

The obtained liquid was filtered through a filter with a pore size of 1 μm, and the filtrate was collected, thereby obtaining an aqueous dispersion liquid (nonvolatile content concentration of 23.2% by mass) of the resin particles 1 formed of a copolymer of methyl methacrylate, isobornyl methacrylate, methacrylic acid, and sodium methacrylate at a mass ratio of 70/20/5/5. The volume average particle diameter of the resin particles P1 was 5.0 nm, and the weight-average molecular weight (Mw) of the resin particles P1 was 60,000.

<Preparation of White Ink>

A white ink having the following composition was prepared using the white pigment dispersion liquid, the dispersion liquid of the resin particle P1, the solvent S1, other water-soluble organic solvents described below, a surfactant described below, and water.

—Composition of White Ink—
White pigment 1: 12% by mass
Block polymer 1 as polymer dispersant: 0.6% by mass
Propylene glycol monopropyl ether (PGmPE) (solvent S1): 1.5% by mass
Ethylene glycol monobutyl ether (EGmBE) (solvent S1): 0.5% by mass
Propylene glycol (PG) (other water-soluble organic solvents): 25% by mass
Resin particles P1: 5% by mass
Surfactant: OLEFINE E1010 (manufactured by Nissin Chemical Co., Ltd., acetylene glycol-based surfactant): 0.5% by mass
Water: remaining amount set such that total amount of composition was 100% by mass <Image Recording>

Image recording was performed in the following manner using the ink described above and a biaxially oriented polypropylene (OPP) film as a base material (thickness of 40 μm, surface treatment: corona discharge treatment, manufactured by Futamura Chemical Co., Ltd.) (impermeable base material).

(1) Recording Method

The ink was applied onto the surface of the base material, on which the corona discharge treatment had been performed, in the form of a solid image, by jetting the ink from the ink jet head using an ink jet recording device including a transport system for transporting the base material and the following ink jet head. The ink applied onto the base material was dried at 80° C. for 30 seconds to obtain a solid image which is a white image. The ink was dried by placing the base material, to which the ink had been applied, on a hot plate.

As described above, an image recorded material including a base material and a solid image disposed on the base material was obtained.

(2) Recording Conditions

Ink jet head: ink jet head "Samba G3L" (manufactured by FUJIFILM Dimatix), which is 1,200 dpi/20 inch width piezo full line head. The diameter of the jetting hole in the ink jet head is 20 μm or less.

Liquid droplet amount of ink: 1.8 pL
Driving frequency: 30 kHz (transport speed of base material: 635 mm/sec)
Ink applying method: single pass method <Measurement and Evaluation>

The following measurement and evaluation were performed.

The results are listed in Table 1.

(Contact Angle of Each Solvent with Respect to Jetting Surface of Ink Jet Head)

The contact angle of each solvent (for example, the solvent S1) used for preparing the ink with respect to the jetting surface of the ink jet head was measured.

The contact angle was measured by the above-described method using a contact angle meter Drop Master DM700 (manufactured by Kyowa Interface Science Co., Ltd.).

(Measurement of Ink Adhesion Rate after Dripping Property Test)

The ink adhesion rate after the dripping property test was measured by performing the dripping property test using the ink and the ink jet head according to the above-described method.

(Measurement of Average Primary Particle Diameter of White Pigment)

The average primary particle diameter of the white pigment in the ink was measured by the above-described method using the ink. A transmission electron microscope 1200EX (manufactured by JEOL Ltd.) was used as a TEM.

(Measurement of Standard Deviation of Volume-Based Particle Size Distribution of Dispersed Particles Containing White Pigment)

The standard deviation of the volume-based particle size distribution of the dispersed particles containing a white pigment in the ink was measured by the above-described method using the ink. A particle size distribution measuring device "NANOTRAC UPA-EX150" (manufactured by Nikkiso Co., Ltd.) was used as a measuring device.

(Continuous Jettability)

The evaluation was performed by continuously jetting the ink from the ink jet head in a mode of 1,200 dpi for 5 minutes and confirming the number of sites where jetting failure (jet bending) occurred by the operation.

The above-described evaluation was carried out 6 times, and the jettability of the ink was evaluated according to the following evaluation standards based on the obtained results. In the following evaluation standards, the rank of the most excellent continuous jettability of the ink is "AA".

—Evaluation Standards for Continuous Jettability of Ink—
- AA: Jetting failure did not occur in six times of evaluations.
- A: Jetting failure occurred at one site in one evaluation, and jetting failure did not occur in five times of evaluations.
- B: Jetting failure occurred at only one site in each of two times of evaluations, and jetting failure did not occur in four times of evaluations.
- C: Jetting failure occurred at only one site in each of three times of evaluations, and jetting failure did not occur in three times of evaluations.
- D: The result corresponded to at least one of a case where jetting failure occurred at only one site in each of four or more times of evaluations or a case where jetting failure occurred at two sites in each of one or more times of evaluations.

(Drying Properties)

The logarithmic decrement (%) of the solid image after 5 minutes from the recording of the solid image (that is, drying of the image at 80° C. for 30 seconds) was measured at the time at which the temperature of the solid image (hereinafter, also referred to as the "sample temperature") was increased to 150° C. from room temperature at a temperature increase rate of 6.0° C./min using a pendulum viscoelasticity tester (rigid pendulum type physical property tester "RPT-3000W", manufactured by A&D Co., Ltd.). Based on the obtained results, the drying properties of the image were evaluated based on the following evaluation standards.

In the evaluation standards, the rank of the most excellent drying properties of the image is "A".

—Evaluation Standards for Drying Properties of Image—
- A: The logarithmic decrement at a sample temperature of 80° C. was less than 4%.
- B: The logarithmic decrement at a sample temperature of 80° C. was 4% or greater and less than 6%.
- C: The logarithmic decrement at a sample temperature of 80° C. was 6% or greater and less than 10%.
- D: The logarithmic decrement at a sample temperature of 80° C. was 10% or greater and less than 15%.
- E: The logarithmic decrement at a sample temperature of 80° C. was 15% or greater.

(Covering Property)

The covering property of the solid image in the image recorded material was evaluated in the following manner.

Black character images (four in total) with sizes of 2 pt (point), 4 pt, 6 pt, and 8 pt were recorded on the OPP base material separately from the image recorded material using a commercially available black ink jet ink, thereby obtaining a base material with black character images. The four black character images were all black character images illustrated in FIG. 1.

The image recorded material and the base material with black character images were overlapped with each other in an orientation in which non-image recorded surfaces (surfaces where the images were not recorded) were in contact to obtain a laminate. The obtained laminate was exposed to a 30 W fluorescent lamp such that the solid image faced the side of the evaluator, the evaluator confirmed whether the details of each black character image were able to be visually recognized through the solid image, and the covering property of the solid image was evaluated based on the following evaluation standards. Here, the distance between the eyes of the evaluator and the laminate was set to 20 cm, and the distance from the laminate to the fluorescent lamp was set to 2 m.

In the evaluation standards, the rank of the most excellent covering property of the solid image is "A".

—Evaluation Standards for Covering Property—
- A: The details of the black character images with sizes of 2 pt, 4 pt, 6 pt, and 8 pt were not able to be visually recognized.
- B: The details of the black character image with a size of 8 pt were able to be visually recognized, but the details of the black character images with sizes of 2 pt, 4 pt, and 6 pt were not able to be visually recognized.
- C: The details of the black character images with sizes of 6 pt and 8 pt were able to be visually recognized, but the details of the black character images with sizes of 2 pt and 4 pt were not able to be visually recognized.
- D: The details of the black character images with sizes of 4 pt, 6 pt, and 8 pt were able to be visually recognized, but the details of the black character image with a size of 2 pt were not able to be visually recognized.
- E: The details of the black character images with sizes of 2 pt, 4 pt, 6 pt, and 8 pt were able to be visually recognized.

Examples 2, 6 to 12, and 15

The same operation as in Example 1 was performed except that the combination of the kind and the content of the solvent S1 was changed as listed in Table 1.

The results are listed in Table 1.

The abbreviations of the solvents in Table 1 have the following meanings.

EGmBE: ethylene glycol monobutyl ether
PGmPE: propylene glycol monopropyl ether
PGmME: propylene glycol monomethyl ether
DPGmME: dipropylene glycol monomethyl ether
DEGmEE: diethylene glycol monoethyl ether
TPG: tripropylene glycol
1-Hex: 1-hexanol
EG: ethylene glycol
PG: propylene glycol Example 3

The same operation as in Example 1 was performed except that the ink jet head was changed to an ink jet head "KJ4A-AA" (manufactured by Kyocera Corporation).

The results are listed in Table 1.

Examples 4 and 5

The same operation as in Example 1 was performed except for the following points. The results are listed in Table 1.

—Differences from Example 1—

The white pigment 1 (titanium dioxide pigment "R-930", manufactured by Ishihara Sangyo Kaisha, Ltd.) was changed to the white pigment 2 or the white pigment 3 described below.

White pigment 2: Titanium dioxide pigment "CR-60", manufactured by Ishihara Sangyo Kaisha, Ltd.

White pigment 3: Titanium dioxide pigment "PF690", manufactured by Ishihara Sangyo Kaisha, Ltd.

In Example 4, a white pigment dispersion liquid was prepared by changing the φ 1 mm zirconia beads to φ0.1 mm zirconia beads and changing the dispersion time from 4 hours to 5 hours.

Example 13

The same operation as in Example 1 was performed except that the white pigment dispersion liquid containing the block polymer 1 as a polymer dispersant was changed to a white pigment dispersion liquid containing a random polymer 1 as a polymer dispersant.

The results are listed in Table 1.

Hereinafter, a method of synthesizing the random polymer 1 as a polymer dispersant and a method of preparing a white pigment dispersion liquid containing the random polymer 1 will be described.

<Synthesis of Random Polymer 1 (Polymer Dispersant)>

A solution I obtained by mixing 234 g of benzyl methacrylate, 120 g of stearyl methacrylate, 84 g of methacrylic acid, 162 g of hydroxyethyl methacrylate, and 3.93 g of 2-mercaptopropionic acid and a solution II obtained by dissolving 6.2 g of t-butyl peroxy-2-ethylhexanoate (PERBUTYL O, manufactured by NOF Corporation) in 115 g of dipropylene glycol were respectively prepared.

605 g of dipropylene glycol was added to a three-neck flask provided with a stirrer and a cooling pipe and heated to 85° C. in a nitrogen atmosphere. Here, the solution I and the solution II were added dropwise thereto respectively over 4 hours and 5 hours.

After the completion of the dropwise addition, the resulting solution was allowed to further react for 2 hours, heated to 95° C., and heated and stirred for 3 hours so that all unreacted monomers were allowed to react. The disappearance of the monomers was confirmed by $^1$H-NMR.

The obtained reaction solution was heated to 70° C., 74 g of dimethylaminoethanol was added thereto as an amine compound, and 764 g of propylene glycol was added thereto, and the resulting solution was stirred, thereby obtaining a solution (solid content: 30% by mass) of the random polymer 1 having a weight-average molecular weight (Mw) of 30,000 and an acid value of 112 mgKOH/g.

The constituent components of the obtained polymer were confirmed by $^1$H-NMR.

<Preparation of White Pigment Dispersion Liquid>

150 parts by mass of the random polymer 1 was dissolved in water, and the solution was adjusted such that the pH after neutralization reached 9 and the concentration of the random polymer 1 reached approximately 25% by mass using a potassium hydroxide aqueous solution, thereby obtaining an aqueous solution of the random polymer 1.

Respective components were mixed as in the composition of the white pigment dispersion liquid described below, and the obtained mixed solution was subjected to a dispersion treatment for 1.5 hours using LABOSTAR Mini LMZ015 (manufactured by Ashizawa Finetech Ltd., bead diameter: 0.1 mmφ, zirconia beads, rotation speed: 10 m/sec), thereby obtaining a white pigment dispersion liquid (white pigment concentration of 48% by mass, solid content concentration of 50% by mass).

—Composition of White Pigment Dispersion Liquid—

Aqueous solution of random polymer 1: 54 parts by mass

White pigment 1 (titanium dioxide pigment "R-930", manufactured by Ishihara Sangyo Kaisha, Ltd.): 500 parts by mass Propylene glycol: 100 parts by mass Water: remaining amount set such that total amount of composition was 1,000 parts by mass Example 14

The same operation as in Example 1 was performed except that the white pigment dispersion liquid containing the block polymer 1 as the polymer dispersant was changed to a white pigment dispersion liquid CL containing the crosslinked polymer 1 as the polymer dispersant.

The results are listed in Table 1.

The white pigment dispersion liquid CL containing the crosslinked polymer 1 as the polymer dispersant was prepared with reference to Synthesis Examples (paragraphs 0071, 0072, and 0075) of JP2009-190379A. Hereinafter, the details will be described.

<Synthesis of Uncrosslinked Water-Soluble Polymer 1 (Polymer Dispersant)>

Dipropylene glycol (198 g) was added to a 2,000 ml three-neck flask provided with a stirrer and a cooling pipe and heated to 85° C. in a nitrogen atmosphere.

A solution I obtained by dissolving benzyl methacrylate (135 g), stearyl methacrylate (90 g), methacrylic acid (75 g), and 2-mercaptopropionic acid (5.7 g) in dipropylene glycol (114 g) and a solution II obtained by dissolving 4.5 g of t-butyl peroxy-2-ethylhexanoate (PERBUTYL O, manufactured by NOF Corporation) in 152 g of dipropylene glycol were respectively prepared.

The solution I was added dropwise to the three-neck flask for 4 hours, and the solution II was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of the monomers was confirmed by $^1$H-NMR.

The obtained reaction solution was heated to 70° C., 82.9 g of a 50 mass % KOH aqueous solution was added thereto, 833 g of pure water was added thereto, and the resulting solution was stirred, thereby obtaining a 20 mass % solution of an uncrosslinked water-soluble polymer 1.

The uncrosslinked water-soluble polymer 1 having an Mw of 8,000 was obtained by removing the solvent under reduced pressure.

<Preparation of White Pigment Dispersion Liquid N Formed of Uncrosslinked Water-Soluble Polymer 1>

The water-soluble polymer 1 (150 parts by mass) was dissolved in water, and the solution was prepared such that the pH after neutralization reached 10.1 and the concentration of the water-soluble polymer 1 reached 30.6% by mass using a potassium hydroxide aqueous solution, thereby obtaining an aqueous solution of the water-soluble polymer 1.

A white pigment 1 (titanium dioxide pigment "R-930", manufactured by Ishihara Sangyo Kaisha, Ltd.) (300 parts by mass) and water (362 parts by mass) were mixed with the aqueous solution (147 parts by mass) of the water-soluble polymer 1, and the obtained mixed solution was subjected to a dispersion treatment for 3 hours using a beads mill (0.1 mmφ zirconia beads), thereby obtaining a white pigment dispersion liquid N (white pigment concentration of 50% by mass, solid content concentration of 52.5% by mass).

<Preparation of White Pigment Dispersion Liquid CL Formed of Crosslinked Polymer 1>

Polyethylene glycol diglycidyl ether (0.35 parts by mass) serving as a crosslinking agent was added to the white pigment dispersion liquid N (70 parts by mass), allowed to react at 50° C. for 6.5 hours, and cooled to 25° C., thereby obtaining a white pigment dispersion liquid CL (white pigment concentration of 50% by mass, solid content concentration of 52.5% by mass) formed of the crosslinked polymer 1.

The crosslinked polymer 1 is a polymer having a crosslinked structure, in which the water-soluble polymer 1 is crosslinked with polyethylene glycol diglycidyl ether serving as a crosslinking agent.

Comparative Example 1

The same operation as in Example 1 was performed except that the solvent S1 having a contact angle of 85° or less with respect to the jetting surface was changed to ethylene glycol (EG) (comparative solvent) having a contact angle of greater than 85° with respect to the jetting surface.

The results are listed in Table 1.

The ink adhesion rate after the dripping property test was 45% by area.

Comparative Example 2

The same operation as in Example 1 was performed except that the liquid droplet amount of the ink jetted from the ink jet head was changed to 0.8 pL.

The results are listed in Table 1.

TABLE 1

| | Ink jet head | | | Ink | | | | Solvent S1 or comparative solvent | |
|---|---|---|---|---|---|---|---|---|---|
| | | | | White pigment | | | Standard deviation of volume-based particle size distribution of dispersed particles containing white pigment (nm) | | Contact angle with respect to jetting surface (°) |
| | Liquid droplet amount of ink (pL) | Diameter of jetting hole (μm) | Ink adhesion rate after dripping property test (% by area) | Type | Average primary particle diameter (nm) | Polymer dispersant | | Type | |
| Example 1 | 1.8 | 17.5 | 10% | White pigment 1 | 252 | Block polymer 1 | 110 | EGmBE PGmME | 74 71 |
| Example 2 | 1.8 | 17.5 | 10% | White pigment 1 | 252 | Block polymer 1 | 110 | EGmBE PGmME | 74 70 |
| Example 3 | 1.8 | 12.0 | 15% | White pigment 1 | 252 | Block polymer 1 | 110 | DPGmME PGmPE | 77 74 |
| Example 4 | 1.8 | 17.5 | 12% | White pigment 2 | 202 | Block polymer 1 | 84 | EGmBE PGmME | 74 70 |
| Example 5 | 1.8 | 17.5 | 14% | White pigment 3 | 240 | Block polymer 1 | 153 | EGmBE PGmME | 74 70 |
| Example 6 | 1.8 | 17.5 | 18% | White pigment 1 | 252 | Block polymer 1 | 110 | PGmPE | 71 |
| Example 7 | 1.8 | 17.5 | 20% | White pigment 1 | 252 | Block polymer 1 | 110 | EGmBE | 74 |
| Example 8 | 1.8 | 17.5 | 31% | White pigment 1 | 252 | Block polymer 1 | 110 | EGmBE PGmME | 74 70 |
| Example 9 | 1.8 | 17.5 | 7% | White pigment 1 | 252 | Block polymer 1 | 110 | EGmBE PGmME | 74 70 |
| Example 10 | 1.8 | 17.5 | 7% | White pigment 1 | 252 | Block polymer 1 | 110 | EGmBE PGmME | 74 70 |
| Example 11 | 1.8 | 17.5 | 24% | White pigment 1 | 252 | Block polymer 1 | 110 | DEGmEE | 77 |
| Example 12 | 1.8 | 17.5 | 32% | White pigment 1 | 252 | Block polymer 1 | 110 | TPG | 81 |
| Example 13 | 1.8 | 17.5 | 11% | White pigment 1 | 252 | Block polymer 1 | 132 | EGmBE PGmME | 74 70 |
| Example 14 | 1.8 | 17.5 | 10% | White pigment 1 | 252 | Crosslinked polymer 1 | 125 | EGmBE PGmME | 74 70 |
| Example 15 | 1.8 | 17.5 | 10% | White pigment 1 | 252 | Block polymer 1 | 110 | 1-HEX | 71 |
| Comparative Example 1 | 1.8 | 17.5 | 45% | White pigment 1 | 252 | Block polymer 1 | 110 | EG (comparative solvent) | 95 |
| Comparative Example 2 | 0.8 | 17.5 | 10% | White pigment 1 | 252 | Block polymer 1 | 110 | EGmBE PGmME | 74 70 |

TABLE 1-continued

| | Ink | | | Other water-soluble organic solvents | | | | | |
|---|---|---|---|---|---|---|---|---|---|
| | Solvent S1 or comparative solvent | | | | Contact | | | | |
| | Boiling point (° C.) | Content (for each type) with respect to total amount of ink (% by mass) | Content (total) with respect to total amount of ink (% by mass) | Type | angle with respect to jetting surface (°) | Boiling point (° C.) | Content with respect to total amount of ink (% by mass) | Evaluation result | | |
| | | | | | | | | Continuous jettability | Drying property | Covering property |
| Example 1 | 171 | 0.5% | 2% | PG | 88 | 188 | 25% | AA | A | A |
| | 149 | 1.5% | | | | | | | | |
| Example 2 | 171 | 0.5% | 2% | PG | 88 | 188 | 25% | AA | A | A |
| | 120 | 1.5% | | | | | | | | |
| Example 3 | 188 | 0.5% | 2% | PG | 88 | 188 | 25% | AA | A | A |
| | 149 | 1.5% | | | | | | | | |
| Example 4 | 171 | 0.5% | 2% | PG | 88 | 188 | 25% | AA | A | C |
| | 120 | 1.5% | | | | | | | | |
| Example 5 | 171 | 0.5% | 2% | PG | 88 | 188 | 25% | B | A | A |
| | 120 | 1.5% | | | | | | | | |
| Example 6 | 149 | 2% | 2% | PG | 88 | 188 | 25% | A | A | A |
| Example 7 | 171 | 2% | 2% | PG | 88 | 188 | 25% | A | A | A |
| Example 8 | 171 | 0.013% | 0.05% | PG | 88 | 188 | 25% | C | A | A |
| | 120 | 0.037% | | | | | | | | |
| Example 9 | 171 | 1.8% | 7% | PG | 88 | 188 | 25% | B | A | A |
| | 120 | 5.2% | | | | | | | | |
| Example 10 | 171 | 3% | 12% | PG | 88 | 188 | 25% | C | A | A |
| | 120 | 9% | | | | | | | | |
| Example 11 | 202 | 2% | 2% | PG | 88 | 188 | 25% | B | A | A |
| Example 12 | 267 | 2% | 2% | PG | 88 | 188 | 25% | C | B | A |
| Example 13 | 171 | 0.5% | 2% | PG | 88 | 188 | 25% | B | A | A |
| | 120 | 1.5% | | | | | | | | |
| Example 14 | 171 | 0.5% | 2% | PG | 88 | 188 | 25% | A | A | A |
| | 120 | 1.5% | | | | | | | | |
| Example 15 | 157 | 2% | 2% | PG | 88 | 188 | 25% | B | A | A |
| Comparative Example 1 | 197 | 2% | 2% | PG | 88 | 188 | 25% | D | A | A |
| Comparative Example 2 | 171 | 0.5% | 2% | PG | 88 | 188 | 25% | AA | A | D |
| | 120 | 1.5% | | | | | | | | |

As listed in Table 1, in Examples 1 to 15 in which the liquid droplet amount of the ink jetted from the ink jet head was 1.0 pL or greater and the adhesion rate of the ink after the dripping property test was 40% by area or less, the continuous jettability of the ink and the covering property were excellent.

On the contrary, in Comparative Example 1 in which the adhesion rate of the ink after the dripping property test was greater than 40% by area, the continuous jettability of the ink was degraded.

Further, in Comparative Example 2 in which the liquid droplet amount of the ink jetted from the ink jet head was less than 1.0 pL, the continuous jettability of the ink was satisfactory, but the covering property was degraded.

Among Examples 1 to 3 and 6, the continuous jettability of the ink was more excellent in Examples 1 to 3 in which the adhesion rate of the ink after the dripping property test was 15% by area or less.

Among Examples 8 to 10, the continuous jettability of the ink was more excellent in Example 9 in which the content of the solvent S1 (that is, the water-soluble organic solvent having a contact angle of 850 or less with respect to the jetting surface) in the ink was in a range of 0.1% by mass to 10% by mass with respect to the total amount of the ink.

Between Examples 11 and 12, the continuous jettability of the ink was more excellent in Example 11 in which the solvent S1 in the ink included a water-soluble organic solvent having a contact angle of 80° or less with respect to the jetting surface.

Between Examples 7 and 11, the continuous jettability of the ink was more excellent in Example 7 in which the solvent S1 in the ink included a water-soluble organic solvent having a contact angle of 750 or less with respect to the jetting surface.

Among Examples 1 to 4, 6, and 7, the continuous jettability of the ink was more excellent in Examples 1 to 4 in which at least two kinds of solvents S1 were provided.

Among Examples 1, 2, 13, and 14, the continuous jettability of the ink was more excellent in Examples 1, 2, and 14 in which the polymer dispersant contained a block polymer or a crosslinked polymer.

Among Examples 1 to 5, the continuous jettability of the ink was more excellent in Examples 1 to 4 in which the standard deviation of the volume-based particle size distribution of the dispersed particles in the ink was 140 nm or less.

Examples 101 to 115 and Comparative Examples 101 and 102

The same operation as in Examples 1 to 15 and Comparative Examples 1 and 2 was performed in Examples 101 to 115 and Comparative Examples 101 and 102 except that a pretreatment liquid having the following composition was applied onto a base material in the form of a solid image and dried, and the ink was applied onto the region of the base material where the pretreatment liquid had been applied so that an image was recorded, in the image recording.

As a result, in Examples 101 to 115 and Comparative Examples 101 and 102, the same results as in Examples 1 to 15 and Comparative Examples 1 and 2 were respectively obtained.

—Composition of Pretreatment Liquid—

Eastek (registered trademark) 1100 (manufactured by Eastman Chemical Company) [polyester resin particles]: 10% by mass in terms of amount of resin particles (solid content)

Glutaric acid (manufactured by Fujifilm Wako Pure Chemical Corporation) [aggregating agent]: 4.1% by mass Propylene glycol (manufactured by Fujifilm Wako Pure Chemical Corporation) [water-soluble organic solvent]: 10% by mass Water: remaining amount set such that total amount of composition was 100% by mass The method of applying and drying the pretreatment liquid was as follows.

The pretreatment liquid was applied to the base material using a wire bar coater. The amount of the pretreatment liquid applied (that is, the number of grams thereof applied per area of 1 m$^2$) was set to 1.5 g/m$^2$.

The drying of the pretreatment liquid was started at a site where the application of the pretreatment liquid was completed, under a temperature condition of 50° C. using a dryer 1.5 seconds after the completion of the application of the pretreatment liquid to the site, and the drying was completed 3.5 seconds after the completion of the application of the pretreatment liquid. The drying time here was 2 seconds.

In Examples 101 to 115 and Comparative Examples 101 and 102, the ink was applied to the region where the pretreatment liquid had been applied and dried as described above, to record an image.

Examples 201 to 215 and Comparative Examples 201 and 202

The same operation as in Examples 1 to 15 and Comparative Examples 1 and 2 was performed in Examples 201 to 215 and Comparative Examples 201 and 202 except that a pretreatment liquid having the following composition was applied onto a base material in the form of a solid image and dried, and the ink was applied onto the region of the base material where the pretreatment liquid had been applied so that an image was recorded, in the image recording.

As a result, in Examples 201 to 215 and Comparative Examples 201 and 202, the same results as in Examples 1 to 15 and Comparative Examples 1 and 2 were respectively obtained.

Further, the pretreatment liquid was applied and dried by the same method as the method for applying and drying the pretreatment liquid in Example 101.

—Composition of Pretreatment Liquid—

Eastek (registered trademark) 1100 (manufactured by Eastman Chemical Company) [polyester resin particles]: 10% by mass in terms of amount of resin particles (solid content)

Aluminum sulfate: 2.7% by mass

Propylene glycol (manufactured by Fujifilm Wako Pure Chemical Corporation) [water-soluble organic solvent]: 10% by mass Water: remaining amount set such that total amount of composition was 100% by mass The disclosure of JP2020-078680 filed on Apr. 27, 2020 is incorporated herein by reference in its entirety.

All documents, patent applications, and technical standards described in the present specification are incorporated herein by reference to the same extent as in a case of being specifically and individually noted that individual documents, patent applications, and technical standards are incorporated by reference.

What is claimed is:

1. An image recording method comprising:
   a step of preparing an ink containing water and a white pigment; and
   a step of jetting the ink from an ink jet head in a liquid droplet amount of 1.0 pL or greater to apply the ink onto a base material,
   wherein in a case where an ink jetting surface of the ink jet head is immersed in the ink in a vertically standing state for 2 seconds, the jetting surface is pulled up from the ink in the state, and the jetting surface is allowed to stand in the state for 1 minute, a ratio of an area of a region to which the ink is adhered to an area of the jetting surface is 40% by area or less.

2. The image recording method according to claim 1, wherein the ratio of the area of the region to which the ink is adhered to the area of the jetting surface is 15% by area or less.

3. The image recording method according to claim 1, wherein the ink further contains a solvent S1 which is a water-soluble organic solvent having a contact angle of 850 or less with respect to the jetting surface, and a content of the solvent S1 is in a range of 0.1% by mass to 10% by mass with respect to a total amount of the ink.

4. The image recording method according to claim 3, wherein the solvent S1 includes a water-soluble organic solvent having a contact angle of 80° or less with respect to the jetting surface.

5. The image recording method according to claim 4, wherein the solvent S1 includes a water-soluble organic solvent having a contact angle of 750 or less with respect to the jetting surface.

6. The image recording method according to claim 3, wherein the solvent S1 includes alkylene glycol monoalkyl ether.

7. The image recording method according to claim 3, wherein the solvent S1 includes at least one selected from the group X consisting of ethylene glycol monopropyl ether, ethylene glycol monobutyl ether, propylene glycol monomethyl ether, propylene glycol monoethyl ether, propylene glycol monopropyl ether, propylene glycol monobutyl ether, and dipropylene glycol monomethyl ether.

8. The image recording method according to claim 7, wherein the solvent S1 includes at least two selected from the group X.

9. The image recording method according to claim 1, wherein a content of a water-soluble organic solvent having a boiling point of 220° C. or higher in the ink is 5% by mass or less.

10. The image recording method according to claim 1, wherein the ink further contains a polymer dispersant, and the polymer dispersant contains a blocking polymer or a polymer having a crosslinked structure.

11. The image recording method according to claim 1, wherein a standard deviation of a volume-based particle size distribution of dispersed particles containing the white pigment in the ink is 140 nm or less.

12. The image recording method according to claim 1, wherein the base material is an impermeable base material.

13. The image recording method according to claim 1, wherein the step of applying the ink is a step of applying the ink onto the base material using a single pass method.

14. The image recording method according to claim 1, wherein a diameter of a jetting hole for jetting the ink in the ink jet head is 20 μm or less.

* * * * *